US012676647B2

(12) United States Patent
Davydov et al.

(10) Patent No.: US 12,676,647 B2
(45) Date of Patent: Jul. 7, 2026

(54) APPARATUS AND METHOD FOR BEAMFORMING FOR DOWNLINK DATA TRANSMISSION IN WIRELESS COMMUNICATION SYSTEM

(71) Applicant: Samsung Electronics Co., Ltd., Suwon-si (KR)

(72) Inventors: Alexei Vladimirovich Davydov, Saratov (RU); Gregory Vladimirovich Morozov, Saratov (RU); Denis Viktorovich Esiunin, Saratov (RU); Dmitry Sergeyevich Dikarev, Saratov (RU); Gregory Aleksandrovich Ermolaev, Saratov (RU); Maksim Viktorovich Esiunin, Saratov (RU); Vladimir Alexandrovich Pestretsov, Saratov (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/678,727

(22) Filed: May 30, 2024

(65) Prior Publication Data

US 2025/0132788 A1     Apr. 24, 2025

(30) Foreign Application Priority Data

Oct. 18, 2023     (RU) ........................... RU2023126704

(51) Int. Cl.
H04B 7/02 (2018.01)
H04B 7/0417 (2017.01)
(Continued)

(52) U.S. Cl.
CPC ......... H04B 7/0417 (2013.01); H04B 7/0473 (2013.01); H04B 7/0617 (2013.01); H04B 7/0626 (2013.01)

(58) Field of Classification Search
CPC .. H04B 7/0417; H04B 7/0473; H04B 7/0617; H04B 7/0626
(Continued)

(56) References Cited

U.S. PATENT DOCUMENTS

| 7,151,951 B2 | 12/2006 | Goransson et al. |
| 8,687,678 B2 | 4/2014 | Hammarwall et al. |
(Continued)

FOREIGN PATENT DOCUMENTS

| CN | 114759961 A | 7/2022 |
| CN | 116800322 A | 9/2023 |
(Continued)

OTHER PUBLICATIONS

3GPP TS 38.214, "NR; Physical layer procedures for data" v17.5.0, Mar. 2023, Specification # 38.214 (3gpp.org), Mar. 30, 2023.
(Continued)

*Primary Examiner* — Zewdu A Kassa
(74) *Attorney, Agent, or Firm* — Jefferson IP Law, LLP

(57) ABSTRACT

A method of beamforming for downlink (DL) transmission in a wireless communication system is provided. The method includes generating, by a base station of the wireless communication system, configuration information required to signal channel state information (CSI) to the BS, wherein the configuration information includes parameters of a code book, wherein the code book defines an overall set of spatial beams in which data streams can be transmitted from the BS, wherein each spatial beam is represented by a discrete Fourier transform (DFT) vector in the code book, and a parameter ($N_{DFT}$) indicative of a maximum number of DFT vectors with one signal polarization in a precoding matrix, transmitting, by the BS, the configuration information from the base station to a user device (UE), based on CSI reference signals (CSI-RSs) received from the BS, choosing,
(Continued)

by the UE, a number (L) of Multiple Input-Multiple Output (MIMO) layers.

20 Claims, 19 Drawing Sheets

(51) Int. Cl.
    *H04B 7/0456*          (2017.01)
    *H04B 7/06*            (2006.01)
(58) Field of Classification Search
    USPC ................ 375/267, 260, 259, 219, 295, 316
    See application file for complete search history.

(56)                    References Cited

U.S. PATENT DOCUMENTS

| | | | |
|---|---|---|---|
| 2016/0294454 A1* | 10/2016 | Onggosanusi | ......... H04B 7/065 |
| 2017/0142699 A1 | 5/2017 | Kang et al. | |
| 2018/0138950 A1 | 5/2018 | Rahman et al. | |
| 2022/0225118 A1 | 7/2022 | Pefkianakis et al. | |
| 2022/0239356 A1 | 7/2022 | Rahman et al. | |
| 2022/0393736 A1 | 12/2022 | Park | |
| 2023/0246696 A1 | 8/2023 | Kim et al. | |
| 2025/0253908 A1* | 8/2025 | Irfan | .................... H04W 24/10 |

FOREIGN PATENT DOCUMENTS

| | | |
|---|---|---|
| EP | 4 002 713 A1 | 5/2022 |
| RU | 2 321 950 C2 | 4/2008 |
| RU | 2 565 016 C2 | 10/2015 |
| WO | 2018/226581 A1 | 12/2018 |
| WO | 2022/242489 A1 | 11/2022 |

OTHER PUBLICATIONS

Russian Notice of Allowance dated Oct. 18, 2023, issued in Russian Application No. 2023126704.

International Search Report dated Dec. 8, 2023, issued in Russian Application No. 2023126704.

International Search Report dated Sep. 4, 2024, issued in International Application No. PCT/KR2024/007208.

* cited by examiner $N_1 = 2$ antenna ports $N_2 = 2$ antenna ports

Digital Ports

FIG. 4B $$\frac{1}{\sqrt{N_{CSI-RS}}}\begin{bmatrix} v_{l,m} \\ \varphi_n v_{l,m} \end{bmatrix} \oplus \textbf{1 MIMO-layer}$$

Figure 4B:
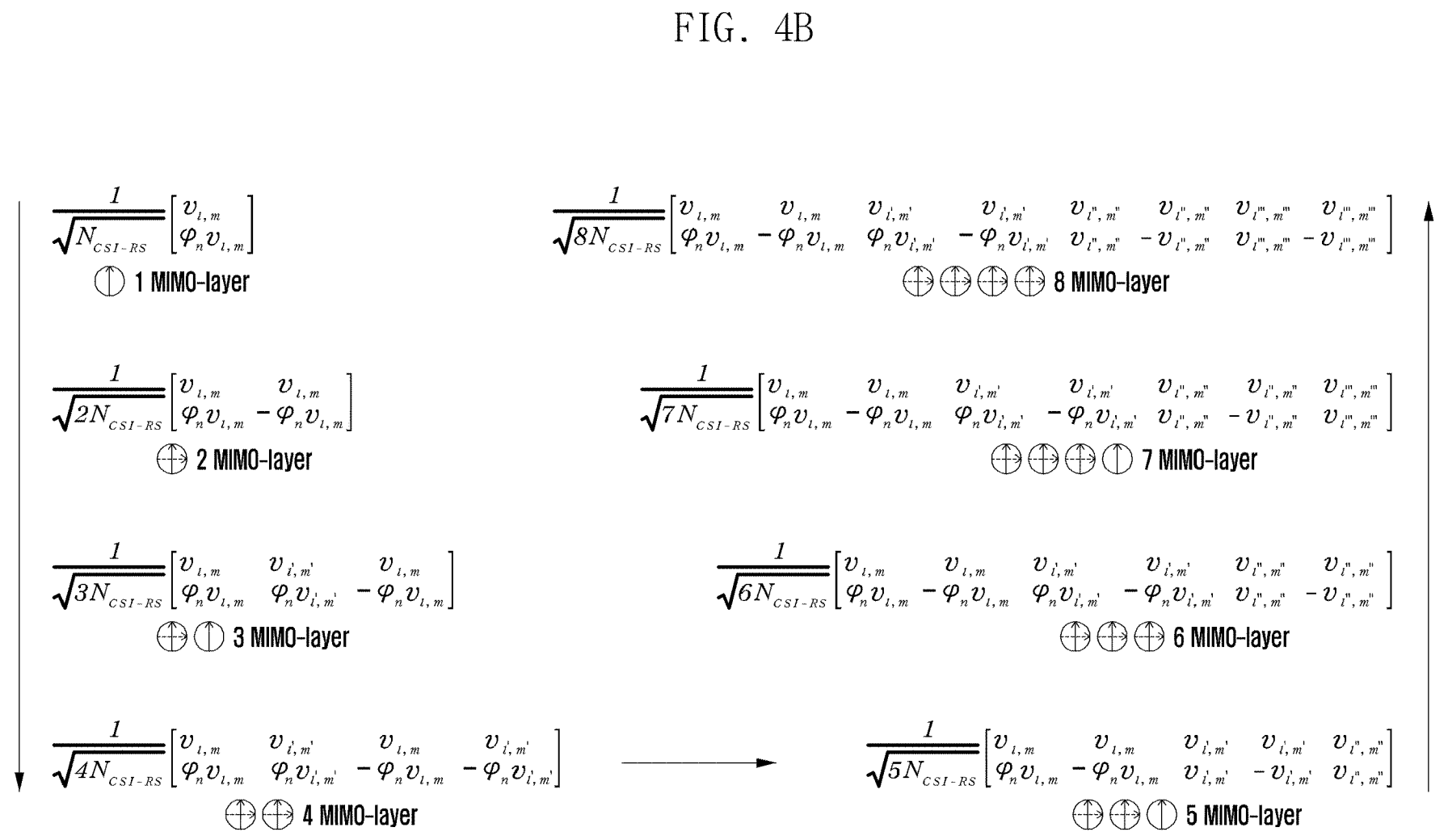

$$\frac{1}{\sqrt{2N_{CSI-RS}}}\begin{bmatrix} v_{l,m} & v_{l,m} \\ \varphi_n v_{l,m} & -\varphi_n v_{l,m} \end{bmatrix} \ominus\oplus \textbf{2 MIMO-layer}$$

$$\frac{1}{\sqrt{3N_{CSI-RS}}}\begin{bmatrix} v_{l,m} & v_{l',m'} & v_{l,m} \\ \varphi_n v_{l,m} & \varphi_n v_{l',m'} & -\varphi_n v_{l,m} \end{bmatrix} \oplus\ominus \textbf{3 MIMO-layer}$$

$$\frac{1}{\sqrt{4N_{CSI-RS}}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix} \oplus\oplus \textbf{4 MIMO-layer}$$

$$\frac{1}{\sqrt{5N_{CSI-RS}}}\begin{bmatrix} v_{l,m} & v_{l,m} & v_{l',m'} & v_{l',m'} & v_{l'',m''} \\ \varphi_n v_{l,m} & -\varphi_n v_{l,m} & \varphi_n v_{l',m'} & -\varphi_n v_{l',m'} & -v_{l'',m''} \end{bmatrix} \oplus\oplus\ominus \textbf{5 MIMO-layer}$$

$$\frac{1}{\sqrt{6N_{CSI-RS}}}\begin{bmatrix} v_{l,m} & v_{l,m} & v_{l',m'} & v_{l',m'} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & -v_{l'',m''} \end{bmatrix} \oplus\oplus\oplus \textbf{6 MIMO-layer}$$

$$\frac{1}{\sqrt{7N_{CSI-RS}}}\begin{bmatrix} v_{l,m} & v_{l,m} & v_{l',m'} & v_{l',m'} & v_{l'',m''} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & v_{l'',m''} & -v_{l'',m''} \end{bmatrix} \oplus\oplus\ominus \textbf{7 MIMO-layer}$$

$$\frac{1}{\sqrt{8N_{CSI-RS}}}\begin{bmatrix} v_{l,m} & v_{l,m} & v_{l',m'} & v_{l',m'} & v_{l'',m''} & v_{l'',m''} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & -v_{l'',m''} & v_{l'',m''} & -v_{l'',m''} \end{bmatrix} \oplus\oplus\oplus\oplus \textbf{8 MIMO-layer}$$

FIG. 10A $N_{DFT} = 4$ $$\frac{1}{\sqrt{S_1 N_{CSI-RS}}} \begin{bmatrix} v_{l,m} \\ \varphi_n v_{l,m} \end{bmatrix}$$

⊕ 1 MIMO-layer [1DFT-vector]

$$\frac{1}{\sqrt{S_2 N_{CSI-RS}}} \begin{bmatrix} v_{l,m} & v_{l,m'} \\ \varphi_n v_{l,m} & \varphi_{n'} v_{l,m'} \end{bmatrix}$$

⊕ 2 MIMO-layer [2DFT-vectors]

$$\frac{1}{\sqrt{S_3 N_{CSI-RS}}} \begin{bmatrix} v_{l,m} & v_{l,m'} & v_{l,m''} \\ \varphi_n v_{l,m} & \varphi_{n'} v_{l,m'} & \varphi_{n''} v_{l,m''} \end{bmatrix}$$

⊕ 3 MIMO-layer [3DFT-vectors]

$$\frac{1}{\sqrt{S_4 N_{CSI-RS}}} \begin{bmatrix} v_{l,m} & v_{l,m'} & v_{l,m''} & v_{l,m'''} \\ \varphi_n v_{l,m} & \varphi_{n'} v_{l,m'} & \varphi_{n''} v_{l,m''} & \varphi_{n'''} v_{l,m'''} \end{bmatrix}$$

⊕ 4 MIMO-layer [4DFT-vectors]

$$\frac{1}{\sqrt{S_5 N_{CSI-RS}}} \begin{bmatrix} v_{l,m} & v_{l,m'} & v_{l,m''} & v_{l,m'''} \\ \varphi_n v_{l,m} & \varphi_{n'} v_{l,m'} & \varphi_{n''} v_{l,m''} & -\varphi_{n'''} v_{l,m'''} \end{bmatrix}$$

⊕ 5 MIMO-layer [4DFT-vectors]

$$\frac{1}{\sqrt{S_6 N_{CSI-RS}}} \begin{bmatrix} v_{l,m} & v_{l,m'} & v_{l,m''} & v_{l,m'''} \\ \varphi_n v_{l,m} & \varphi_{n'} v_{l,m'} & -\varphi_{n''} v_{l,m''} & -\varphi_{n'''} v_{l,m'''} \end{bmatrix}$$

⊕ 6 MIMO-layer [4DFT-vectors]

$$\frac{1}{\sqrt{S_7 N_{CSI-RS}}} \begin{bmatrix} v_{l,m} & v_{l,m'} & v_{l,m''} & v_{l,m'''} \\ \varphi_n v_{l,m} & -\varphi_{n'} v_{l,m'} & -\varphi_{n''} v_{l,m''} & -\varphi_{n'''} v_{l,m'''} \end{bmatrix}$$

⊕ 7 MIMO-layer [4DFT-vectors]

$$\frac{1}{\sqrt{S_8 N_{CSI-RS}}} \begin{bmatrix} v_{l,m} & v_{l,m'} & v_{l,m''} & v_{l,m'''} \\ \varphi_n v_{l,m} & -\varphi_{n'} v_{l,m'} & -\varphi_{n''} v_{l,m''} & -\varphi_{n'''} v_{l,m'''} \end{bmatrix}$$

⊕ 8 MIMO-layer [4DFT-vector]

FIG. 10B $N_{DFT} = 6$ $$\frac{1}{\sqrt{S_1 N_{CSI-RS}}}\begin{bmatrix} v_{l,m} \\ \varphi_n v_{l,m} \end{bmatrix}$$

1 MIMO-layer [1DFT-vector]

$$\frac{1}{\sqrt{S_2 N_{CSI-RS}}}\begin{bmatrix} v_{l,m} & v_{l,m'} \\ \varphi_n v_{l,m} & \varphi_{n'} v_{l,m'} \end{bmatrix}$$

2 MIMO-layer [2DFT-vectors]

$$\frac{1}{\sqrt{S_3 N_{CSI-RS}}}\begin{bmatrix} v_{l,m} & v_{l,m'} & v_{l,m''} \\ \varphi_n v_{l,m} & \varphi_{n'} v_{l,m'} & \varphi_{n''} v_{l,m''} \end{bmatrix}$$

3 MIMO-layer [3DFT-vectors]

$$\frac{1}{\sqrt{S_4 N_{CSI-RS}}}\begin{bmatrix} v_{l,m} & v_{l,m'} & v_{l,m''} & v_{l,m'''} \\ \varphi_n v_{l,m} & \varphi_{n'} v_{l,m'} & \varphi_{n''} v_{l,m''} & \varphi_{n'''} v_{l,m'''} \end{bmatrix}$$

4 MIMO-layer [4DFT-vectors]

$$\frac{1}{\sqrt{S_5 N_{CSI-RS}}}\begin{bmatrix} v_{l,m} & v_{l,m'} & v_{l,m''} & v_{l,m'''} & v_{\tilde{l},\tilde{m}} \\ \varphi_n v_{l,m} & \varphi_{n'} v_{l,m'} & \varphi_{n''} v_{l,m''} & \varphi_{n'''} v_{l,m'''} & \varphi_{\tilde{n}} v_{\tilde{l},\tilde{m}} \end{bmatrix}$$

5 MIMO-layer [5DFT-vectors]

$$\frac{1}{\sqrt{S_6 N_{CSI-RS}}}\begin{bmatrix} v_{l,m} & v_{l,m'} & v_{l,m''} & v_{l,m'''} & v_{\tilde{l},\tilde{m}} & v_{\tilde{l},\tilde{m}} \\ \varphi_n v_{l,m} & \varphi_{n'} v_{l,m'} & \varphi_{n''} v_{l,m''} & \varphi_{n'''} v_{l,m'''} & \varphi_{\tilde{n}} v_{\tilde{l},\tilde{m}} & \varphi_{\tilde{n}'} v_{\tilde{l},\tilde{m}} \end{bmatrix}$$

6 MIMO-layer [6DFT-vectors]

$$\frac{1}{\sqrt{S_7 N_{CSI-RS}}}\begin{bmatrix} v_{l,m} & v_{l,m'} & v_{l,m''} & v_{\tilde{l},\tilde{m}} & v_{\tilde{l},\tilde{m}} & v_{l,m} \\ \varphi_n v_{l,m} & \varphi_{n'} v_{l,m'} & \varphi_{n''} v_{l,m''} & \varphi_{\tilde{n}} v_{\tilde{l},\tilde{m}} & \varphi_{\tilde{n}'} v_{\tilde{l},\tilde{m}} & -\varphi_n v_{l,m} \end{bmatrix}$$

7 MIMO-layer [6DFT-vectors]

$$\frac{1}{\sqrt{S_8 N_{CSI-RS}}}\begin{bmatrix} v_{l,m} & v_{l,m'} & v_{l,m''} & v_{l,m'''} & v_{\tilde{l},\tilde{m}} & v_{\tilde{l},\tilde{m}} & v_{l,m} & v_{l,m'} \\ \varphi_n v_{l,m} & \varphi_{n'} v_{l,m'} & \varphi_{n''} v_{l,m''} & \varphi_{n'''} v_{l,m'''} & \varphi_{\tilde{n}} v_{\tilde{l},\tilde{m}} & \varphi_{\tilde{n}'} v_{\tilde{l},\tilde{m}} & -\varphi_n v_{l,m} & -\varphi_{n'} v_{l,m'} \end{bmatrix}$$

8 MIMO-layer [6DFT-vector]

FIG. 10C $$N_{DFT} = 8$$

$$\frac{1}{\sqrt{S_1 N_{CSI-RS}}} \begin{bmatrix} v_{l,m} \\ \varphi_n v_{l,m} \end{bmatrix}$$

$\oplus$ 1 MIMO-layer [1DFT-vector]

$$\frac{1}{\sqrt{S_2 N_{CSI-RS}}} \begin{bmatrix} v_{l,m} & v_{l,m}' \\ \varphi_n v_{l,m} & \varphi_{n'} v_{l,m}' \end{bmatrix}$$

$\oplus\ominus$ 2 MIMO-layer [2DFT-vectors]

$$\frac{1}{\sqrt{S_3 N_{CSI-RS}}} \begin{bmatrix} v_{l,m} & v_{l,m}' & v_{l,m}'' \\ \varphi_n v_{l,m} & \varphi_{n'} v_{l,m}' & \varphi_{n''} v_{l,m}'' \end{bmatrix}$$

$\oplus\ominus\oplus$ 3 MIMO-layer [3DFT-vectors]

$$\frac{1}{\sqrt{S_4 N_{CSI-RS}}} \begin{bmatrix} v_{l,m} & v_{l,m}' & v_{l,m}'' & v_{l,m}''' \\ \varphi_n v_{l,m} & \varphi_{n'} v_{l,m}' & \varphi_{n''} v_{l,m}'' & \varphi_{n'''} v_{l,m}''' \end{bmatrix}$$

$\oplus\ominus\oplus\ominus$ 4 MIMO-layer [4DFT-vectors]

$$\frac{1}{\sqrt{S_5 N_{CSI-RS}}} \begin{bmatrix} v_{l,m} & v_{l,m}' & v_{l,m}'' & v_{\bar{l},\bar{m}} & v_{\bar{l},\bar{m}} \\ \varphi_n v_{l,m} & \varphi_{n'} v_{l,m}' & \varphi_{n''} v_{l,m}'' & \varphi_{\bar{n}} v_{\bar{l},\bar{m}} & \varphi_{\bar{n}} v_{\bar{l},\bar{m}} \end{bmatrix}$$

$\oplus\ominus\oplus\ominus\ominus$ 5 MIMO-layer [5DFT-vectors]

$$\frac{1}{\sqrt{S_6 N_{CSI-RS}}} \begin{bmatrix} v_{l,m} & v_{l,m}' & v_{l,m}'' & v_{\bar{l},\bar{m}} & v_{\bar{l},\bar{m}} & v_{\bar{l},\bar{m}} \\ \varphi_n v_{l,m} & \varphi_{n'} v_{l,m}' & \varphi_{n''} v_{l,m}'' & \varphi_{\bar{n}} v_{\bar{l},\bar{m}} & \varphi_{\bar{n}'} v_{\bar{l},\bar{m}} & \varphi_{\bar{n}''} v_{\bar{l},\bar{m}} \end{bmatrix}$$

$\oplus\ominus\oplus\ominus\ominus\ominus$ 6 MIMO-layer [6DFT-vectors]

$$\frac{1}{\sqrt{S_7 N_{CSI-RS}}} \begin{bmatrix} v_{l,m} & v_{l,m}' & v_{l,m}'' & v_{l,m}''' & v_{\bar{l},\bar{m}} & v_{\bar{l},\bar{m}} & v_{\bar{l},\bar{m}} \\ \varphi_n v_{l,m} & \varphi_{n'} v_{l,m}' & \varphi_{n''} v_{l,m}'' & \varphi_{n'''} v_{l,m}''' & \varphi_{\bar{n}} v_{\bar{l},\bar{m}} & \varphi_{\bar{n}'} v_{\bar{l},\bar{m}} & \varphi_{\bar{n}''} v_{\bar{l},\bar{m}} \end{bmatrix}$$

$\oplus\ominus\oplus\ominus\oplus\ominus\ominus$ 7 MIMO-layer [7DFT-vectors]

$$\frac{1}{\sqrt{S_8 N_{CSI-RS}}} \begin{bmatrix} v_{l,m} & v_{l,m}' & v_{l,m}'' & v_{l,m}''' & v_{\bar{l},\bar{m}} & v_{\bar{l},\bar{m}} & v_{\bar{l},\bar{m}} & v_{\bar{l},\bar{m}} \\ \varphi_n v_{l,m} & \varphi_{n'} v_{l,m}' & \varphi_{n''} v_{l,m}'' & \varphi_{n'''} v_{l,m}''' & \varphi_{\bar{n}} v_{\bar{l},\bar{m}} & \varphi_{\bar{n}'} v_{\bar{l},\bar{m}} & \varphi_{\bar{n}''} v_{\bar{l},\bar{m}} & \varphi_{\bar{n}'''} v_{\bar{l},\bar{m}} \end{bmatrix}$$

$\oplus\ominus\oplus\ominus\oplus\ominus\oplus\ominus$ 8 MIMO-layer [8DFT-vector]

FIG. 10D $N_{DFT} = 1$ $$\frac{1}{\sqrt{N_{CSI-RS}}} \begin{bmatrix} v_{l,m} \\ \varphi_n v_{l,m} \end{bmatrix}$$
⊖ 1 MIMO-layer

$$\frac{1}{\sqrt{2N_{CSI-RS}}} \begin{bmatrix} v_{l,m} & v_{l,m} \\ \varphi_n v_{l,m} & -\varphi_n v_{l,m} \end{bmatrix}$$
⊕ 2 MIMO-layer

$$\frac{1}{\sqrt{3N_{CSI-RS}}} \begin{bmatrix} v_{l,m} & v_{l,m'} & v_{l,m} \\ \varphi_n v_{l,m} & \varphi_n v_{l,m'} & -\varphi_n v_{l,m} \end{bmatrix}$$
⊕⊖ 3 MIMO-layer

$$\frac{1}{\sqrt{4N_{CSI-RS}}} \begin{bmatrix} v_{l,m} & v_{l,m'} & v_{l,m} & v_{l,m'} \\ \varphi_n v_{l,m} & \varphi_n v_{l,m'} & -\varphi_n v_{l,m} & -\varphi_n v_{l,m'} \end{bmatrix}$$
⊕⊕ 4 MIMO-layer

$$\frac{1}{\sqrt{8N_{CSI-RS}}} \begin{bmatrix} v_{l,m} & v_{l,m} & v_{l,m'} & v_{l,m'} & v_{l'',m} & v_{l'',m} & v_{l'',m''} & v_{l'',m''} \\ \varphi_n v_{l,m} & -\varphi_n v_{l,m} & \varphi_n v_{l,m'} & -\varphi_n v_{l,m'} & v_{l'',m} & -v_{l'',m} & v_{l'',m''} & -v_{l'',m''} \end{bmatrix}$$
⊕⊕⊕⊖ 8 MIMO-layer

$$\frac{1}{\sqrt{7N_{CSI-RS}}} \begin{bmatrix} v_{l,m} & v_{l,m} & v_{l,m'} & v_{l,m'} & v_{l'',m} & v_{l'',m} & v_{l'',m''} \\ \varphi_n v_{l,m} & -\varphi_n v_{l,m} & \varphi_n v_{l,m'} & -\varphi_n v_{l,m'} & v_{l'',m} & -v_{l'',m} & v_{l'',m''} \end{bmatrix}$$
⊕⊕⊕ 7 MIMO-layer

$$\frac{1}{\sqrt{6N_{CSI-RS}}} \begin{bmatrix} v_{l,m} & v_{l,m} & v_{l,m'} & v_{l,m'} & v_{l'',m} & v_{l'',m} \\ \varphi_n v_{l,m} & -\varphi_n v_{l,m} & \varphi_n v_{l,m'} & -\varphi_n v_{l,m'} & v_{l'',m} & -v_{l'',m} \end{bmatrix}$$
⊕⊕⊕ 6 MIMO-layer

$$\frac{1}{\sqrt{5N_{CSI-RS}}} \begin{bmatrix} v_{l,m} & v_{l,m} & v_{l,m'} & v_{l,m'} & v_{l'',m''} \\ \varphi_n v_{l,m} & -\varphi_n v_{l,m} & \varphi_n v_{l,m'} & -\varphi_n v_{l,m'} & v_{l'',m''} \end{bmatrix}$$
⊕⊕⊖ 5 MIMO-layer

FIG. 11A $$\frac{1}{\sqrt{S_{10}N_{CSI-RS}}}\begin{bmatrix} v_{l,m} & v_{\hat{l},m'} & v_{\hat{l},m''}''' & v_{\tilde{l},\tilde{m}} & v_{\tilde{l},\tilde{m}} & v_{\hat{l},m}'' & v_{\hat{l},m}''' \\ \varphi_n v_{l,m} & \varphi_{n'} v_{\hat{l},m'} & \varphi_{n''} v_{\hat{l},m''}''' & \varphi_{\tilde{n}} v_{\tilde{l},\tilde{m}} & -\varphi_{n'} v_{\hat{l},m'} & -\varphi_{n''} v_{\hat{l},m}'' & -\varphi_{n'''} v_{\hat{l},m}''' \end{bmatrix}$$

10 MIMO-layer [6 DFT-vectors, N_DFT = 6]   Extra MIMO layers $$\frac{1}{\sqrt{S_{10}N_{CSI-RS}}}\begin{bmatrix} v_{l,m} & v_{\hat{l},m'} & v_{\hat{l},m''}''' & v_{\tilde{l},\tilde{m}} & v_{\hat{l},\tilde{m}}''' & v_{\hat{l},m}'' & v_{\hat{l},m'}''' \\ \varphi_n v_{l,m} & \varphi_{n'} v_{\hat{l},m'} & \varphi_{n''} v_{\hat{l},m''}''' & \varphi_{\tilde{n}} v_{\tilde{l},\tilde{m}} & \varphi_{\tilde{n}} v_{\hat{l},\tilde{m}}''' & -\varphi_{n''} v_{\hat{l},m}'' & -\varphi_{n'} v_{\hat{l},m'} \end{bmatrix}$$

10 MIMO-layer [8 DFT-vectors, N_DFT = 8]   Extra MIMO layers $$\frac{1}{\sqrt{S_{12}N_{CSI-RS}}}\begin{bmatrix} v_{l,m} & v_{\hat{l},m'} & v_{\hat{l},m''}''' & v_{\tilde{l},\tilde{m}} & v_{\tilde{l},\tilde{m}} & v_{\hat{l},m}'' & v_{\hat{l},m'} \\ \varphi_n v_{l,m} & \varphi_{n'} v_{\hat{l},m'} & \varphi_{n''} v_{\hat{l},m''}''' & \varphi_{\tilde{n}} v_{\tilde{l},\tilde{m}} & -\varphi_{\tilde{n}} v_{\tilde{l},\tilde{m}} & -\varphi_{n''} v_{\hat{l},m}'' & -\varphi_{n'} v_{\hat{l},m'} \end{bmatrix}$$

12 MIMO-layer [6 DFT-vectors, N_DFT = 6]   Extra MIMO layers $$\frac{1}{\sqrt{S_{12}N_{CSI-RS}}}\begin{bmatrix} v_{l,m} & v_{\hat{l},m'} & v_{\hat{l},m''}''' & v_{\tilde{l},\tilde{m}} & v_{\tilde{l},\tilde{m}} & v_{\hat{l},m}'' & v_{\hat{l},m}''' \\ \varphi_n v_{l,m} & \varphi_{n'} v_{\hat{l},m'} & \varphi_{n''} v_{\hat{l},m''}''' & \varphi_{\tilde{n}} v_{\tilde{l},\tilde{m}} & -\varphi_{\tilde{n}} v_{\tilde{l},\tilde{m}} & -\varphi_{n''} v_{\hat{l},m}'' & -\varphi_{n'''} v_{\hat{l},m}''' \end{bmatrix}$$

12 MIMO-layer [8 DFT-vectors, N_DFT = 8]   Extra MIMO layers

APPARATUS AND METHOD FOR BEAMFORMING FOR DOWNLINK DATA TRANSMISSION IN WIRELESS COMMUNICATION SYSTEM

CROSS-REFERENCE TO RELATED APPLICATION(S)

This application is based on and claims priority under 35 U.S.C. § 119(a) of a Russian patent application number 2023126704, filed on Oct. 18, 2023, in the Russian Intellectual Property Office, the disclosure of which is incorporated by reference herein in its entirety.

BACKGROUND

1. Field

The disclosure relates to wireless communications. More particularly, the disclosure relates to devices and methods for beamforming for downlink data transmission.

2. Description of Related Art

Nowadays more and more active deployment of $5^{th}$ Generation (5G) New Radio (NR) networks takes place whose advantages and capabilities are broadly known.

In a 5G NR system, base stations (BSs) use massive antenna arrays comprising plural transceiving antenna elements (AEs) that enable to efficiently use the Multiple Input-Multiple Output (MIMO) technology when a number of spatial MIMO streams or MIMO layers, which are to be transmitted simultaneously, are generated to transmit data (for example, the physical downlink data shared channel (PDSCH)).

Generally speaking, a digital signal is transmitted or received by one or more digital ports coupled to antenna elements of a base station via a radio frequency unit which performs the function of forward and inverse conversion of the digital signal into an analog one. In particular, for the frequency range of 3.5 GHz up to 64 digital antenna ports can be employed which enable to use, in base stations, various precoding schemes. For instance, the spatial multiplexing (SM) technology enables to reuse the same time-frequency resources to transmit plural signals (MIMO layers) to one or more user devices (UEs), while the adaptive beamforming technology enables to dynamically steer power of a transmitted signal into one or more predefined directions. Usage of advanced modulation techniques, such as orthogonal frequency-division multiplexing (OFDM), provides efficient broadband signal transmission.

More specifically, one of the basic precoding technologies supported in 5G NR relies on using a code book which is in general a representation of the overall set of spatial beams in which MIMO layers can be transmitted from a base station.

A brief description of the 5G NR beamforming technique based on usage of a code book in downlink (DL) is given below in order to provide understanding of the technical context of the disclosure. Details of this technology are reflected in specification TS 38.214, v.17.4.0 which is entirely included herein by reference.

FIG. 1 illustrates an example of part of a two-dimensional (2D) antenna array of a base station, wherein antenna elements (which are schematically depicted as x in this figure) are virtualized into $N_1=2$ antenna ports in horizontal direction and $N_2=2$ antenna ports in vertical direction, according to the related art.

Referring to FIG. 1, a subset of three adjacent antenna elements corresponds to each antenna port in this case. The capability of each port to emit a signal with one of two different, orthogonal polarizations (P=2) is also taken into account. These orthogonal polarizations may be linear polarizations (vertical and horizontal), as well as circular (right and left) polarizations. As a result, the considered antenna subarray supports $N_1 \times N_2 \times P = 8$ digital antenna ports. In essence, $N_1$ corresponds to a dimension along one (herein horizontal) spatial direction, $N_2$ corresponds to a dimension along another (herein vertical) spatial direction, and P corresponds to the polarization dimension. Similar consideration naturally applies to subarrays with other desires dimensions $(N_1, N_2)$.

Channel state information (CSI) reference signals (RSs)—i.e. CSI-RSs—are transmitted from the base station to inform user devices about digital antenna ports. Depending on implementation, each CSI-RS may correspond to one digital antenna port, or further virtualization is carried out in such a way that each CSI-RS may correspond to more than one (e.g. two) digital antenna ports. In other words, taking this further virtualization into account, the virtualized representation of antenna elements of the antenna array of the base station as CSI-RS antenna ports is eventually employed. It should be noticed that a user device, when communicating with the base station, does not need to be aware of an actual structure of the antenna array of the base station—said communication is substantially performed on the level of CSI-RS antenna ports of the base station, i.e. every CSI-RS antenna port is regarded as a single emitting element, irrespective of antenna elements encompassed thereby.

FIG. 2 shows an illustrative representation of a code book with reliance on the subarray considered above with reference to FIG. 1 according to the related art.

Each of the possible spatial beams in which the base station can carry out directed data transmission is represented by a beamforming digital Fourier transform (DFT) vector in the code book. The code book is basically illustrated in FIG. 2 by a 2D (along horizontal and vertical directions) grid of beams. Every beam and, hence, the DFT vector associated therewith, is depicted by a circle in said grid. Light-grey circles schematically depict the DFT vectors that directly correspond to the $N_1 \times N_2 = 4$ (i.e. the two in horizontal direction, the two in vertical direction) antenna ports illustrated in FIG. 1. These DFT vectors are orthogonal to each other. Moreover, by using oversampling coefficients $(O_1, O_2)$, a sequential linear phase shift per DFT vector is provided in the directions $N_1$, $N_2$, respectively, as a consequence, the total density of the considered structure of beams increases significantly. As a result, the dimension of the code book is $N_1 \times O_1$ in horizontal direction and $N_2 \times O_2$ in vertical direction, i.e. the total number of DFT vectors in the code book is $(N_1 \times O_1) \times (N_2 \times O_2)$. DFT vectors is the code book are accordingly indexed by index l, l=0, . . . , $(N_1 \times O_1)-1$, in horizontal direction and by index m, m=0, . . . , $(N_2 \times O_2)-1$, in vertical direction. In the case considered in FIG. 2, $O_1=O_2=4$. The specific way in which DFT vectors of the code book are calculated will be described below. It should be noticed that the scheme according to FIG. 2 should be considered not taking polarization into account, i.e. in such a way that each of the DFT vectors is used with one polarization.

For illustrative purposes, the black circle in FIG. 2 schematically depicts a specific beam (i.e. a specific transmission direction) selected from the code book.

The code book illustrated in FIG. 2 substantially corresponds to the 5G NR Type 1 code book. Possible supported configurations of the Type 1 code book follow from Table 5.2.2.2.1-2 (see below) from the abovementioned specification.

TABLE 5.2.2.2.1-2

| Number of CSI-RS antenna ports | $(N_1, N_2)$ | $(O_1, O_2)$ |
|---|---|---|
| 4 | (2, 1) | (4, 1) |
| 8 | (2, 2) | (4, 4) |
| | (4, 1) | (4, 1) |
| 12 | (3, 2) | (4, 4) |
| | (6, 1) | (4, 1) |
| 16 | (4, 2) | (4, 4) |
| | (8, 1) | (4, 1) |
| 24 | (4, 3) | (4, 4) |
| | (6, 2) | (4, 4) |
| | (12, 1) | (4, 1) |
| 32 | (4, 4) | (4, 4) |
| | (8, 2) | (4, 4) |
| | (16, 1) | (4, 1) |

Therefore, support of at most 8 MIMO layers per UE can be provided in the base station.

FIG. 3 illustratively shows a generalized scheme of interaction between a wireless communication network (NW) and a user device to enable precoding at a base station which is part of said network according to the related art.

The base station sends configuration information comprising CSI configuration (action 1). The base station also transmits (e.g. periodically) CSI-RSs from all its CSI-RS antenna ports (action 2), and the user device performs measurements with respect to received CSI-RS (action 3). Upon reception, from the base station, of a CSI feedback indication (action 4), the user device performs calculations to generate CSI based on the performed measurements and the received configuration (action 5).

The user device calculates a plurality of parameters which are included into the CSI being generated. In particular, the user device chooses a preferable number L of MIMO layers which corresponds to a number of data streams simultaneously transmitted from the base station that the user device intends to receive. The number L of MIMO layers is reflected by the parameter RI within the CSI. Furthermore, the user device generates the precoding matrix (PM) from DFT vectors corresponding to spatial streams recommended by the user device for transmitting thereto said number L of MIMO. The DFT vectors are selected to this end from the code book whose parameters (see Table 5.2.2.2.1-2 above) can be signaled to the user device within the CSI configuration. The generated precoding matrix is reflected by the parameter PMI within the CSI. The format of representation of the PMI is described in the abovementioned specification. Moreover, the user device determines a channel quality indicator (CQI) which is also to be included into the CSI.

The generated CSI, including inter alia the RI, the PMI, the CQI, is transmitted from the user device to the base station in response to said feedback indication (action 6 of FIG. 3). Upon reception of the CSI, the base station, in particular, uses the CQI to select a modulation and coding scheme (MCS), and applies the obtained precoding matrix to perform precoding, along with respective beamforming (action 7), to carry out transmission (e.g. of PDSCH) to the user device (action 8).

Calculation of a precoding matrix W at the UE side for the 5G NR Type 1 code book is illustrated hereinafter with reference to FIGS. 4A and 4B.

Every DFT vector $v_{l,m}$ represents Kronecker product of column vector $v_l$, where $$v_l = \left[ 1 \quad e^{j\frac{2\pi l}{N_1 O_1}} \quad \ldots \quad e^{j\frac{2\pi l(N_1-1)}{N_1 O_1}} \right]^T,$$  Equation 1

$$l = 0, \ldots , (N_1 \times O_1) - 1,$$

by column vector $u_m$, where $$u_m = \left[ 1 \quad e^{j\frac{2\pi m}{N_2 O_2}} \quad \ldots \quad e^{j\frac{2\pi m(N_2-1)}{N_2 O_2}} \right]^T,$$  Equation 2

$$m = 0, \ldots , (N_2 \times O_2) - 1,$$

that is $$v_{l,m} = v_l \otimes u_m.$$  Equation 3

In Equations 1 and 2, j is imaginary unit, T denotes transposition.

The number of elements in vector $v_l$ equals the number of antenna ports along one spatial dimension (in horizontal direction in this case), i.e. $N_1$, and the number of elements in vector $u_m$ equals the number of antenna ports along another spatial dimension (in vertical direction in this case), i.e. $N_2$, furthermore, $N_1$ should be equal to or greater than $N_2$, thereby defining the choice of a particular spatial dimension as said one and other dimensions (see FIGS. 1 and 2 for illustration). Therefore, the number of elements in any DFT vector $v_{l,m}$ is $N_1 \times N_2$. See Table 5.2.2.2.1-2 with respect to possible values of parameters $N_1$, $O_1$, $N_2$, $O_2$.

FIG. 4A shows a general structure of the precoding matrix being generated according to the related art. The number of precoding vectors which the precoding matrix is comprised of (in this case—its columns) equals the number L of MIMO layers chosen by the user device (see action 5 described above with reference to FIG. 3). Multiplier $\varphi_n$, where $$\varphi_n = e^{j\frac{\pi n}{2}},$$  Equation 4

$$n = 0, 1, 2, 3,$$

which is applied to the DFT vector, characterizes co-phasing associated with one of polarizations. The number of elements in each column of the precoding matrix respectively equals the number of digital antenna ports, more specifically, $N_1 \times N_2 \times 2$.

Referring to FIG. 4A, the precoding matrix as a whole is multiplied by the normalization multiplier $1/\sqrt{L \cdot N_{CSI\text{-}RS}}$, where $N_{CSI\text{-}RS}$ is the number of CSI-RS antenna ports, which substantially corresponds to uniform distribution of transmission power of the base station onto all the L MIMO layers. That is, usage of every new MIMO layer in any case proportionally reduces allocation of power per MIMO layer.

FIG. 4B provides examples of the precoding matrix generated based on the 5G NR Type 1 code book, sequentially for the chosen number of MIMO layers from L equal to 1 (the upper left corner) to the maximum number equal to 8 (the upper right corner, the traversal direction is shown by arrows) according to the related art. The general principle which underlays said generating is seen from the illustration, in particular, at first the polarization dimension is used to the maximum extent, and only thereafter a new DFT vector from the code book (i.e. the DFT dimension) is utilized. For instance, in the precoding matrix for two MIMO layers (L=2) one DFT vector with two different polarizations is used, which is accordingly reflected by the co-phasing multipliers $\varphi_n$ and $-\varphi_n$. This in fact implies that both MIMO layers will be transmitted from the base station to the user device in one spatial beam but with different, orthogonal polarizations.

This principle is also seen in FIG. 4B for other values of L. The sequence of the prioritized usage of polarization is shown in FIG. 4B in circles. The orthogonal polarizations are shown in this figure as vertical and horizontal ones only as a non-limiting example.

As discussed above, the precoding matrix generated in such a way, which is signaled by the user device to the base station via the PMI within the CSI, is used in the base station for respective beamforming to transmit data.

FIG. 5 schematically shows application of precoding in a transmitter of the base station according to the related art.

For illustrative purposes, contours illustrate possible beams in which transmission of data streams from the base station can be performed, and also a generated beam is shown which corresponds to one of DFT vectors in the signaled precoding matrix. For example, such a spatial beam may be the beam for the case L=2, as considered above with reference to FIG. 4B.

Though deployment of 5G NR systems in the world is only spinning up, nevertheless active research is being already carried out now in different directions for standardization of next generation wireless communication systems, so called sixth generation (6G), which will have characteristics exceeding 5G NR.

In particular, for the 6G operating range of 10-13 GHz (UPPER MID BAND), it is planned to support, at base stations, ultra-large antenna arrays (for instance, comprised on 3072 antenna elements), hybrid analog and digital beamforming with a large number of antenna ports (≤256). Therefore, by supporting, in particular, up to 64 simultaneously transmitted spatial MIMO layers in UPPER MID BAND communication systems, the concept of radio interface with ultra-large antenna array (xMIMO) will be rendered to a principally new level. Moreover, support of a set of reference signals similar to the one used in 5G NR, such as DM-RS, CSI-RS, SRS, PT-RS, PSS/SSS, is planned in 6G.

At the same time, approaches used in 5G NR can far from always be directly extrapolated to next generation communication systems.

In particular, as follows from the above discussion, the existing 5G NR Type 1 code book supports at most 32 CSI-RS antenna ports and 8 MIMO layers per UE, whereas support of up to 256 digital antenna ports and 16 MIMO layers per UE is required for 6G communication systems.

Furthermore, the following problem arises. 3072 antenna elements in the base station antenna array provide a very narrow beam pattern with a high antenna gain. Greater importance in this context is imposed on control of power emitted by the base station in various directions.

A parameter by which the emitted power is controlled is Effective Isotropic Radiated Power (EIRP). The EIRP represents a maximum power emitted by the antenna in a given direction with the highest antenna gain, and it is defined as follows.

$$EIRP = G_a + P_{Tx} - C, \qquad \text{Equation 5}$$

where Ga is the antenna gain in the given direction, $P_{Tx}$ is the total transmission power from the base station, C is the impairment factor (in the context of the application it can be set equal to 0, without loss of generality). The EIRP unit is dB.

Power emitted by the base station in any direction must respectively not exceed a EIRP threshold, i.e. preset value maxEIRP. Therefore, in some cases (e.g. when performing transmission in a single spatial beam) significant reduction of power $P_{Tx}$ of the base station may be needed to satisfy the EIRP requirements. This aspect is illustrated in FIG. 6.

FIG. 6 is an illustration of reducing transmission power of the base station in view of the EIRP restrictions according to the related art.

At the same time, said need to reduce transmission power in the base station owing to the EIRP restrictions is not taken into account by the existing 5G NR code book structure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a code book structure which enables to support more than 32 CSI-RS antenna ports and more than 8 MIMO layers per UE.

Another aspect of the disclosure is to adapt the presently used precoding matrix to optimize utilization of transmission power available in a base station in view of existing restrictions.

Additional aspects will be set forth in part in the description which follows and, in part, will be apparent from the description, or may be learned by practice of the presented embodiments.

In accordance with an aspect of disclosure, a method of beamforming for DL transmission in a wireless communication system is provided. The method includes generating, by a base station (BS) of the wireless communication system, configuration information required to signal CSI to the BS, wherein the configuration information includes parameters of a code book, wherein the code book defines an overall set of spatial beams in which data streams can be transmitted from the BS, wherein each spatial beam is represented by a DFT vector in the code book, and a parameter $N_{DFT}$ indicative of a maximum number of DFT vectors with one polarization in a precoding matrix, transmitting, by the BS, the configuration information to a UE.

The method further includes, based on CSI-RSs received from the BS, choosing, by the UE, a number (L) of MIMO layers, said number corresponding to a number of data streams simultaneously transmitted from the BS which the UE is ready to receive, generating, by the UE, the precoding matrix based on DFT vectors selected from the code book, wherein a number of precoding vectors which the precoding matrix includes equals L, and wherein the generating of the precoding matrix includes, if $L \leq N_{DFT}$, then generating L precoding vectors by using L different DFT vectors, each being used with one polarization, or, if $N_{DFT} < L \leq 2N_{DFT}$, then generating $N_{DFT}$ precoding vectors by using $N_{DFT}$ different DFT vectors, each being used with one polarization, and generating further $N_{next}$ precoding vectors, where $N_{next} = L - N_{DFT}$, by using $N_{next}$ DFT vectors from the $N_{DFT}$ DFT vectors, each of the $N_{next}$ DFT vectors being used with a polarization different from said one polarization with which said DFT vector has been already used in the precoding matrix, or, if $L > 2N_{DFT}$, then generating L precoding vectors by using $N_{DFT} = \mathrm{ceil}(L/2)$ different DFT vectors, wherein each of floor(L/2) DFT vectors among the $N_{DFT}$ DFT vectors is used with two different polarizations to generate 2·floor(L/2) precoding vectors, and, if mod(L,2)=1, a remaining DFT vector among the $N_{DFT}$ DFT vectors is used with one polarization to generate a respective precoding vector.

According to a preferred embodiment, said different DFT vectors are orthogonal DFT vectors, and said different polarizations are orthogonal signal polarizations.

The method further includes, generating, by the UE, the CSI including an indication (RI) of the chosen number L of MIMO layers, and an indication (PMI) of the precoding matrix, and transmitting the generated CSI to the BS.

The method further includes performing, by the BS, precoding along with beamforming based on the RI and the PMI from the CSI received from the UE.

According to an embodiment, normalization information for power normalizing the precoding matrix is further included into the configuration information. In this case, the method further includes, after the generating the precoding matrix, in the UE, determining normalization parameters for the generated precoding matrix by using said normalizing information, wherein the determined normalization parameters include a common normalization parameter to be applied to the precoding matrix as a whole, and one or more individual normalization parameters to be respectively applied to individual precoding vectors or groups of precoding vectors of the precoding matrix, and applying the determined normalization parameters to the generated precoding matrix.

According to an embodiment, L is chosen from a plurality of preset values, where a maximum value of L equals 16. The method further includes, for each value of L among said plurality of preset values, calculating, by the BS, a respective common normalization parameter based on a predefined EIRP restriction, an antenna gain of the BS, a transmission power of the BS, and said value of L, and including the calculated common normalization parameters into said normalizing information. The determining of the normalization parameters includes selecting, among the calculated common normalization parameters, a common normalization parameter corresponding to said chosen number L of MIMO layers, for being applied to the generated precoding matrix. Said applying the common normalization parameter includes multiplying the precoding matrix by a normalization multiplier which includes said common normalization parameter.

According to an embodiment, the method further includes determining, by the UE, L individual normalization parameters, wherein the individual normalization parameters are respectively individual for the L MIMO layers. Said applying of the normalization parameters further includes multiplying the precoding vectors of the precoding matrix by the respective determined individual normalization parameters.

In the determining individual normalization parameters, an individual normalization parameter can be determined for each precoding vector of the precoding matrix depending on whether or not a same DFT vector is used with different signal polarizations both for a MIMO layer associated with said precoding vector and for a MIMO layer associated with another precoding vector of the precoding matrix.

The determining of the individual normalization parameters includes setting an individual normalization parameter for each precoding vector of the precoding matrix can be defined equal to 1.

In accordance with another aspect of the disclosure, a method of beamforming for DL transmission in a wireless communication system is provided. The method includes generating, by the BS of the wireless communication system, configuration information required to signal CSI to the BS, wherein the configuration information includes parameters of a code book, wherein the code book defines an overall set of spatial beams in which data streams can be transmitted from the BS, and wherein each spatial beam is represented by a DFT vector in the code book, and normalization information for power normalizing a precoding matrix. The configuration information is transmitted from the BS to a UE, preferably by using DCI, MAC, RRC signaling or combination thereof.

The method further includes, based on CSI-RSs received from the BS, choosing, by the UE, a number (L) of MIMO layers, said number corresponding to a number of data streams simultaneously transmitted from the BS which the UE is ready to receive, and generating, by the UE, the precoding matrix based on DFT vectors selected from the code book, wherein a number of precoding vectors which the precoding matrix includes equals L. The method further includes, determining, by the UE, normalization parameters for the generated precoding matrix by using said normalizing information from the configuration information, wherein the determined normalization parameters include a common normalization parameter to be applied to the precoding matrix as a whole, and one or more individual normalization parameters to be respectively applied to individual precoding vectors or groups of precoding vectors of the precoding matrix, and applying, by the UE, the determined normalization parameters to the generated precoding matrix.

The method further includes, generating, by the UE, the CSI including an indication (RI) of the chosen number L of MIMO layers, and an indication (PMI) of the precoding matrix, and transmitting the generated CSI to the BS.

The method further includes performing, by the BS, precoding along with beamforming based on the RI and the PMI from the CSI received from the UE.

According to an embodiment, L is chosen from a plurality of preset values, where a maximum value of L equals 16. The method further includes, for each value of L among said plurality of preset values, calculating, by the BS, a respective common normalization parameter based on a predefined EIRP restriction, an antenna gain of the BS, a transmission power of the BS, and said value of L, and including, by the BS, the calculated common normalization parameters into said normalizing information. Said determining of the normalization parameters include selecting, among the calculated common normalization parameters, a common normalization parameter corresponding to said chosen number L of MIMO layers, for being applied to the generated precoding matrix. Said applying of the common normalization parameter includes multiplying the precoding matrix by a normalization multiplier which includes said common normalization parameter.

According to an embodiment, the method further includes determining, by the UE, L individual normalization parameters, wherein the individual normalization parameters are respectively individual for the L MIMO layers. Said applying of the normalization parameters further includes multiplying the precoding vectors of the precoding matrix by the respective determined individual normalization parameters.

In the determining of the individual normalization parameters, an individual normalization parameter can be determined for each precoding vector of the precoding matrix depending on whether or not a same DFT vector is used with different signal polarizations both for a MIMO layer associated with said precoding vector and for a MIMO layer associated with another precoding vector of the precoding matrix.

In the determining of the individual normalization parameters, an individual normalization parameter for each precoding vector of the precoding matrix can be defined equal to 1.

According to an embodiment, a parameter $N_{DFT}$ indicative of a maximum number of DFT vectors with one polarization in the precoding matrix is further included into the configuration information. In this case, said generating of the precoding matrix includes if $L \leq N_{DFT}$, then generating L precoding vectors by using L different DFT vectors, each being used with one signal polarization, or, if $N_{DFT} < L \leq 2N_{DFT}$, then generating $N_{DFT}$ precoding vectors by using $N_{DFT}$ orthogonal DFT vectors, each being used with one signal polarization, and generating further $N_{next}$ precoding vectors, where $N_{next} = L - N_{DFT}$, by using $N_{next}$ DFT vectors from the $N_{DFT}$ DFT vectors, each of the Next DFT vectors being used with a signal polarization orthogonal to said one signal polarization with which said DFT vector has been already used in the precoding matrix, or, if $L > 2N_{DFT}$, then generating L precoding vectors by using $N_{DFT} = \text{ceil}(L/2)$ orthogonal DFT vectors, wherein each of floor(L/2) DFT vectors among the $N_{DFT}$ DFT vectors is used with two orthogonal signal polarizations to generate 2·floor (L/2) precoding vectors, and, if mod(L,2)=1, a remaining DFT vector among the $N_{DFT}$ DFT vectors is used with one signal polarization to generate a respective precoding vector.

The abovementioned first and second aspects of the disclosure can be implemented separately or in combination.

In accordance with another aspect of the disclosure, a method of beamforming for DL transmission in a wireless communication system is provided. The method includes generating, by a BS of the wireless communication system, configuration information required to signal CSI to the BS. At least, parameters of a code book, a parameter $N_{DFT}$, and normalization information for power normalizing a precoding matrix are included into the configuration information. The code book defines an overall set of spatial beams in which data streams can be transmitted from the BS, wherein each spatial beam is represented by a DFT vector in the code book. The $N_{DFT}$ is indicative of a maximum number of DFT vectors with one polarization in the precoding matrix. The configuration information is transmitted from the BS to a UE.

According to the method provided herein, the UE performs measurements of CSI-RSs received from the BS. Then, upon reception by the UE, from the BS, of a CSI feedback indication, the method further includes, based on the measurements of the CSI-RSs, choosing, by the UE, a number (L) of MIMO layers, said number corresponding to a number of data streams simultaneously transmitted from the BS which the UE is ready to receive, and generating, by the UE, the precoding matrix based on DFT vectors selected from the code book, wherein a number of precoding vectors which the precoding matrix includes equals L. The generating of the precoding matrix includes if $L \leq N_{DFT}$, then generating L precoding vectors by using L orthogonal DFT vectors, each being used with one signal polarization, or, if $N_{DFT} < L \leq 2N_{DFT}$, then generating $N_{DFT}$ precoding vectors by using $N_{DFT}$ orthogonal DFT vectors, each being used with one signal polarization, and generating further $N_{next}$ precoding vectors, where $N_{next} = L - N_{DFT}$, by using $N_{next}$ DFT vectors from the $N_{DFT}$ DFT vectors, each of the Next DFT vectors being used with a signal polarization orthogonal to said one signal polarization with which said DFT vector has been already used in the precoding matrix, or, if $L > 2N_{DFT}$, then generating L precoding vectors by using $N_{DFT} = \text{ceil}(L/2)$ orthogonal DFT vectors, wherein each of floor(L/2) DFT vectors among the $N_{DFT}$ DFT vectors is used with two orthogonal signal polarizations to generate 2·floor (L/2) precoding vectors, and, if mod(L,2)=1, a remaining DFT vector among the $N_{DFT}$ DFT vectors is used with one signal polarization to generate a respective precoding vector.

The method further includes determining, by the UE, normalization parameters for the generated precoding matrix by using said power normalization information from the configuration information, wherein the determined normalization parameters include a common normalization parameter to be applied to the precoding matrix as a whole, and one or more individual normalization parameters to be respectively applied to individual precoding vectors or groups of precoding vectors of the precoding matrix. The method further includes applying the determined normalization parameters to the generated precoding matrix.

The method further includes, generating, by the UE, the CSI including an indication (RI) of the chosen number L of MIMO layers, and an indication (PMI) of the precoding matrix, and transmitting the generated CSI to the BS.

The method further includes, performing, by the BS, precoding along with beamforming based on the RI and the PMI from the CSI received from the UE.

In accordance with another aspect of the disclosure, a wireless communication system is provided. The system includes a BS and a UE. The BS includes a first transceiver configured to receive and transmit a signal, first memory storing first computer programs, and one or more first processors communicatively coupled to the first transceiver and the first memory. The UE includes a second transceiver configured to receive and transmit a signal, second memory storing second computer programs, and one or more second processors communicatively coupled to the second transceiver and the second memory, wherein the one or more first computer programs and the one or more second computer programs include computer-executable instructions that, when executed by the one or more first processors and the one or more second processors, cause the wireless communication system to generate, by the BS, configuration information required to signal channel state information (CSI) to the BS, wherein the configuration information includes parameters of a code book, wherein the code book defines an overall set of spatial beams in which data streams can be transmitted from the BS, and wherein each spatial beam is represented by a discrete Fourier transform (DFT) vector in the code book, and a parameter ($N_{DFT}$) indicative of a maximum number of DFT vectors with one signal polarization in a precoding matrix, transmit, by the BS, the configuration information to a user device (UE).

The one or more first computer programs and the one or more second computer programs include computer-executable instructions that, when executed by the one or more first processors and the one or more second processors, cause the wireless communication system to, based on CSI reference signals (CSI-RSs) received from the BS, choose, by the UE, a number (L) of MIMO layers, said number corresponding to a number of data streams simultaneously transmitted from the BS which the UE is ready to receive, generate, by the UE, the precoding matrix based on DFT vectors selected from the code book, wherein a number of precoding vectors which the precoding matrix is included of equals L, and wherein the generating of the precoding matrix includes if $L \leq N_{DFT}$, then generating L precoding vectors by using L different DFT vectors, each being used with one signal polarization, or if $N_{DFT} < L \leq 2N_{DFT}$, then generating $N_{DFT}$ precoding vectors by using $N_{DFT}$ different DFT vectors, each being used with one signal polarization, and generating further $N_{next}$ precoding vectors, where $N_{next} = L - N_{DFT}$, by using $N_{next}$ DFT vectors from the $N_{DFT}$ DFT vectors, each of the $N_{next}$ DFT vectors being used with a signal polarization different from said one signal polarization with which said DFT vector has been already used in the precoding matrix, or if $L > 2N_{DFT}$, then generating L precoding vectors by using $N_{DFT} = ceil(L/2)$ different DFT vectors, wherein each of floor(L/2) DFT vectors among the $N_{DFT}$ DFT vectors is used with two different signal polarizations to generate 2·floor (L/2) precoding vectors, and, if mod(L,2)=1, a remaining DFT vector among the $N_{DFT}$ DFT vectors is used with one signal polarization to generate a respective precoding vector.

The one or more first computer programs and the one or more second computer programs include computer-executable instructions that, when executed by the one or more first processors and the one or more second processors, cause the wireless communication system to generate, by the UE, the CSI including an indication (RI) of the chosen number L of MIMO layers, and an indication (PMI) of the precoding matrix, transmit the generated CSI to the BS, and perform, by the BS, precoding along with beamforming based on the RI and the PMI from the CSI received from the UE.

In accordance to another aspect of the disclosure, one or more non-transitory computer-readable storage media storing one or more computer programs including computer-executable instructions that, when executed by one or more processors of a wireless communication system, cause the wireless communication system to perform operations are provided. The operations include generating, by a base station (BS) of the wireless communication system, configuration information required to signal channel state information (CSI) to the BS, wherein the configuration information include, parameters of a code book, wherein the code book defines an overall set of spatial beams in which data streams can be transmitted from the BS, wherein each spatial beam is represented by a discrete Fourier transform (DFT) vector in the code book, and a parameter ($N_{DFT}$) indicative of a maximum number of DFT vectors with one signal polarization in a precoding matrix.

The operations further include transmitting, by the BS, the configuration information to a user device (UE), based on CSI reference signals (CSI-RSs) received from the BS choosing, by the UE, a number (L) of MIMO layers, said number corresponding to a number of data streams simultaneously transmitted from the BS which the UE is ready to receive, generating, by the UE, the precoding matrix based on DFT vectors selected from the code book, wherein a number of precoding vectors which the precoding matrix is included of equals L, and wherein the generating of the precoding matrix include if $L \leq N_{DFT}$, then generating L precoding vectors by using L different DFT vectors, each being used with one signal polarization, or if $N_{DFT} < L \leq 2N_{DFT}$, then generating $N_{DFT}$ precoding vectors by using $N_{DFT}$ different DFT vectors, each being used with one signal polarization, and generating further $N_{next}$ precoding vectors, where $N_{next} = L - N_{DFT}$, by using $N_{next}$ DFT vectors from the $N_{DFT}$ DFT vectors, each of the $N_{next}$ DFT vectors being used with a signal polarization different from said one signal polarization with which said DFT vector has been already used in the precoding matrix, or if $L > 2N_{DFT}$, then generating L precoding vectors by using $N_{DFT} = ceil(L/2)$ different DFT vectors, wherein each of floor(L/2) DFT vectors among the $N_{DFT}$ DFT vectors is used with two different signal polarizations to generate 2·floor(L/2) precoding vectors, and, if mod(L,2)=1, a remaining DFT vector among the $N_{DFT}$ DFT vectors is used with one signal polarization to generate a respective precoding vector.

The operations further include generating, by the UE, the CSI including an indication (RI) of the chosen number L of MIMO layers, and an indication (PMI) of the precoding matrix, transmitting the generated CSI to the BS, and performing, by the BS, precoding along with beamforming based on the RI and the PMI from the CSI received from the UE.

The technical result achievable by the disclosure relates to providing implementation of precoding with extension to support of systems with ultra-large antenna arrays, as well as to improved efficiency of operating in scenarios with restrictions on transmission power.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A and 4B are illustrations of calculating a precoding matrix at the user device side for the 5G NR code book according to the related art;

FIGS. 10A, 10B, 10C, 10D, 11A, and 11B are illustrative examples of precoding matrices generated according to various embodiments of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 7:
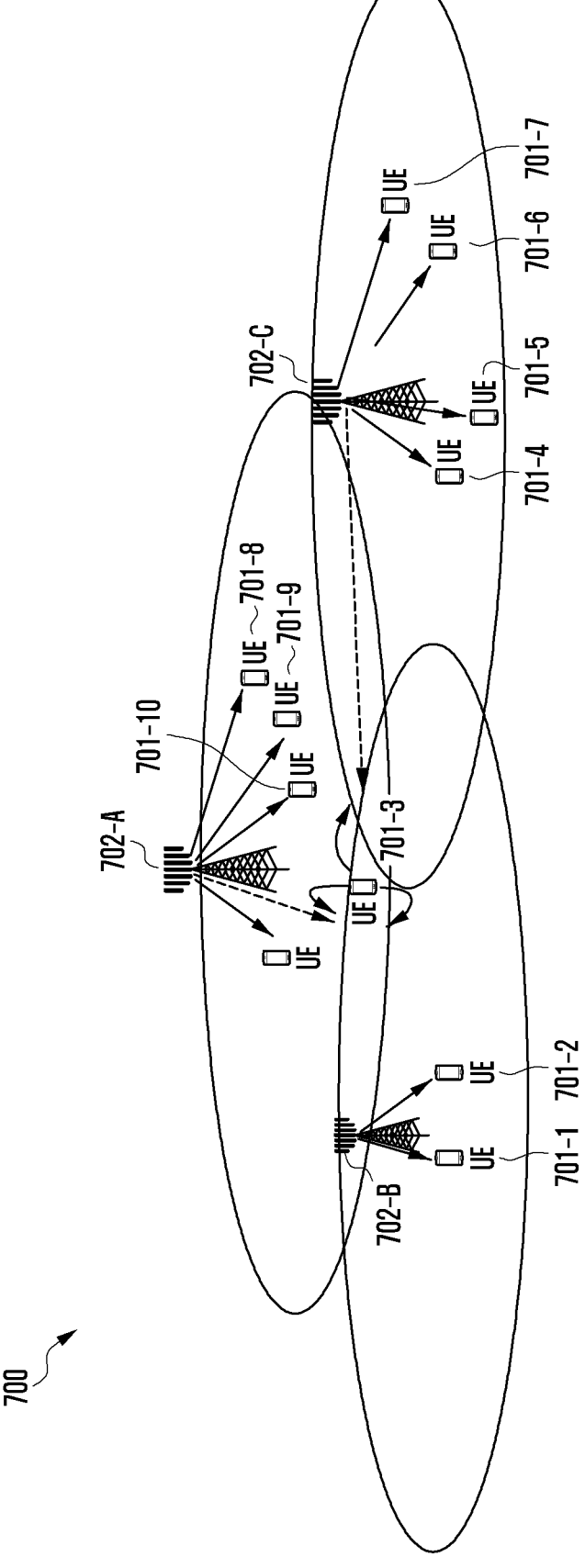
FIG. 7 is an illustrative scheme of a wireless communication system according to an embodiment of the disclosure.

FIG. 7 generally illustrates a wireless communication system according to an embodiment of the disclosure.

Referring to FIG. 7, user devices (UEs) 701 communicate with base stations (BSs) 702 in a radio access network (RAN) 700. UEs 701 (for example, UE 701-1, 701-2, 701-3, . . . ) are distributed over the RAN 700, and each of the UEs 701 can be fixed or mobile. Broadly known examples of UEs are smartphones, tablets, modems, etc.

The base stations 702 (for example, the BSs 702-A, 702-B, 702-C) can provide coverage for a specific geographic area oftentimes referred to as 'cell'. The base stations 702 basically have fixed structure, but they can have mobile implementation as well. In general, the base stations can represent macro-BSs (as illustrated by the BSs 702-A, 702-B, 702-C in FIG. 7), as well as pico-BSs for pico-cells or femto-BSs for femto-cells. Cells in turn can be divided into sectors.

Coordination and management of operating the base stations 702 can be provided by a network controller which is in communication therewith (for instance, via a backhaul connection). The RAN 700 may be in communication with a core network (CN) (for example, via the network controller) which provides various network functions, such as e.g. access and mobility management, session management, authentication server function, application function, etc. Moreover, the base stations 702 in the RAN 700 can also connect to each other (for instance, via a direct physical connection).

When a user device is moving within the RAN 700, handover of the device from one BS to another BS can be performed. For example, the UE 701-3 can be handed over from the BS 702-B to the BS 702-A. While performing this, respective operation parameters of the UE are reconfigured for operation with the new BS. The UE can be also handed over between sectors of one BS.

In the 5G NR wireless communication system the Cloud RAN (C-RAN) concept is implemented that refers to dividing a base station into three parts and using a special interface defined to exchange information between these functional parts. In particular, the BS can be divided into a radio unit (RU) which carries out radio transceiver functions, a distributed unit (DU) for L1 (physical level) and L2 (media access control (MAC) level) computations, and a centralized unit for L2 and L3 (radio resource control (RRC) level) computations. Such a division enables to centralize CUs in a respective central network node, whereas DUs can be distributed to a greater extent in cell nodes. In this case switching of connections between cell nodes can be performed on the L1 level, i.e. with relatively small delays. Support of this concept is also expected in wireless communication networks of next generations.

It should be noticed that the description according to FIG. 7 and said figure itself have exclusively illustrative, non-limiting nature with the aim of outlining the general operation environment of the disclosure. Though only known basic components of the communication system are illustrated in FIG. 7, it should be appreciated that the communication system can further include plural other elements.

Each of the BSs 702 shown in FIG. 7 includes hardware and logical means to implement respective functions in the BS. The hardware means refer to, in particular, an antenna array comprised of transceiving antenna elements which have been discussed above, various specially configured processors, controllers, data storage devices, other circuit elements, as well as buses connecting them. The logical means refer to software which is stored in respective memory devices and configures respective circuit elements. Firmware directly hardwired in processors and controllers also refers to the software. The abovementioned hardware means are configured inter alia to perform various processing with respect to transmitted and received signals, including (de)modulation, (de)multiplexing, (de)coding, amplifying, filtering, digitizing, (de)interleaving, resource allocation, reception/transmission scheduling.

In a similar way, each of the UEs 701 shown in FIG. 7 includes hardware and logical means to implement respective functions in the UE. The hardware means refer to, in particular, transceiving devices with respective antenna elements, various specially configured processor(s), controllers, data storage devices, other circuit elements, as well as buses connecting them. The logical means refer to software which is stored in respective memory devices and configures respective circuit elements. Firmware directly hardwired in controllers also refers to the software. The indicated hardware means are configured inter alia to perform various processing with respect to transmitted and received signals, including (de)modulation, (de)multiplexing, (de)coding, amplifying, filtering, digitizing, (de)interleaving. Moreover, the UE comprises means to interact with a user, including a touch screen, speakers/microphone, buttons, as well as user applications which are stored in the memory of the UE and executed by the processor of the UE in a respective operating system.

Examples of the abovementioned processors/controllers include microprocessors, microcontrollers, digital signal processors (DSPs), field programmable gate arrays (FPGAs), discrete hardware integrated circuits, etc. Firmware/software executed by the processors/controllers should be understood broadly, as referring to computer-executable instructions, instruction sets, program code, code segments, subroutines, program modules, objects, procedures, etc. The software is stored in respective computer-readable media which can be implemented e.g. in the form of random-access memory (RAM), read-only memory (ROM), electrically erasable programmable (EEPROM), solid state storage devices, magnetic storage devices, optical storage devices, etc. which can be recorded with respective program codes and data structures that can be accessed by respective processors/controllers.

The hardware and software elements of BSs and UEs, as listed above, are configured for enabling to perform, in the BSs and UEs, the methods according to the application which are described hereinbelow. Implementation itself of the component hardware means of the BSs and the UEs and specific configuring thereof, including by respective logical means, is known in the technical field which the application relates to. Moreover, various functions according to the methods of the application can be performed in plural separate elements or in one or more integral elements, as defined by design structural characteristics.

Hereinafter, with reference to FIGS. 8A to 8C and with due account for the aforesaid in describing the background art, a case of beamforming for performing transmission from a base station to a user device in the EIRP restriction scenario is considered, as an illustration of a cause for the disclosure.

Figure 8A:
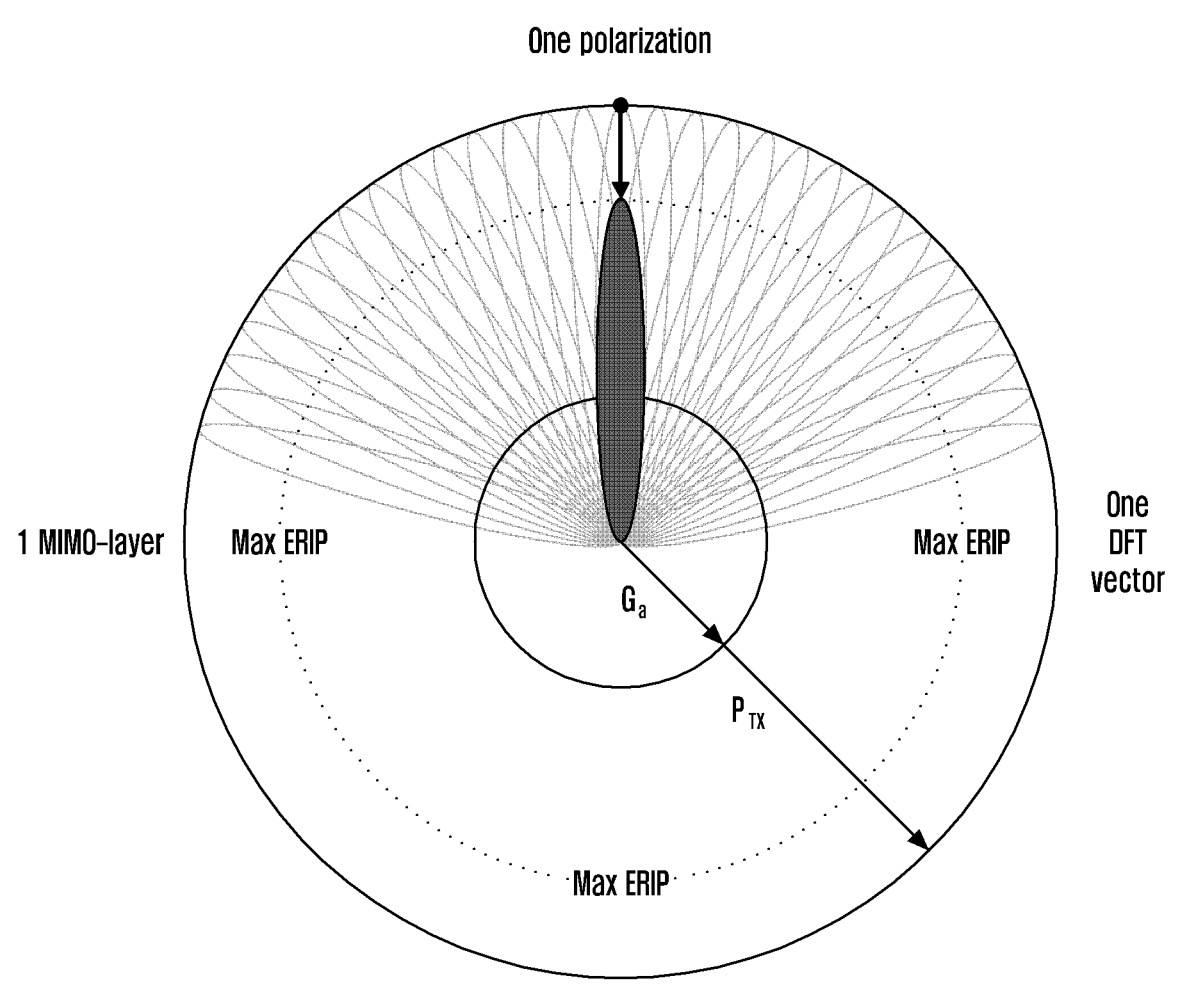
FIGS. 8A, 8B, and 8C are examples of beamforming according to the 5G NR approach in the scenario with the transmission power restriction according to various embodiments of the disclosure.
Figure 8B:
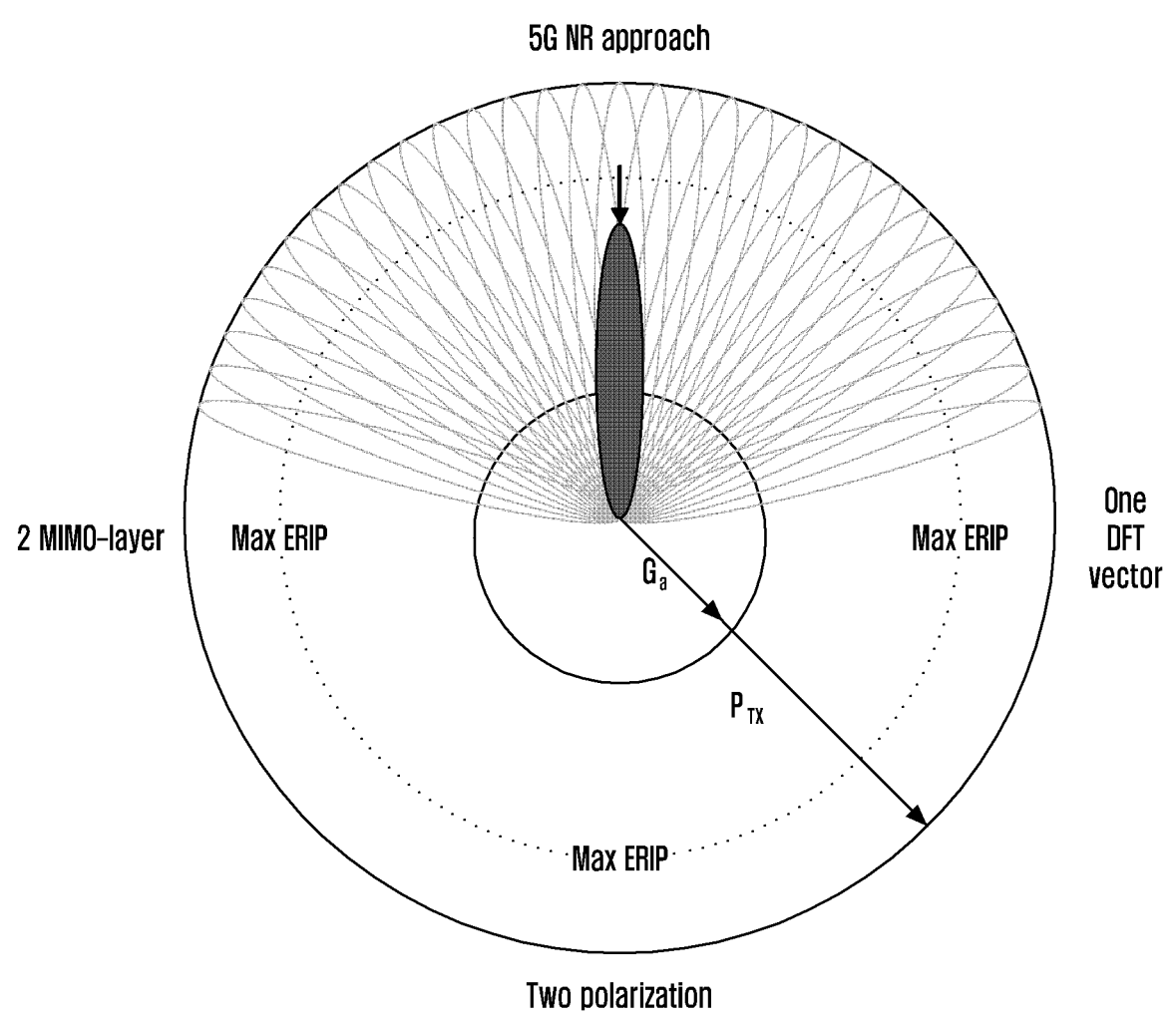
Figure 8C:
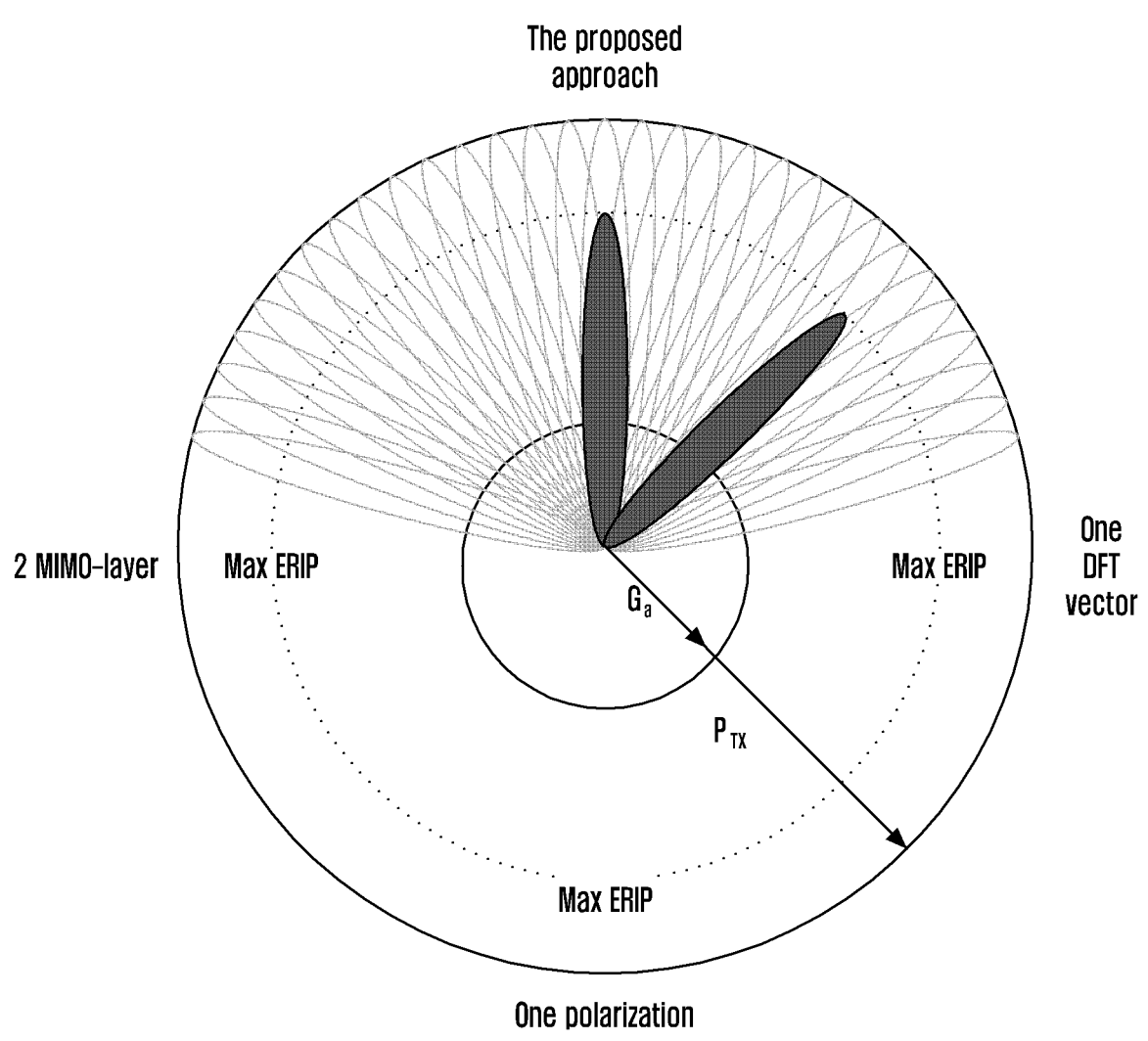

FIGS. 8A, 8B, and 8C are examples of beamforming according to the 5G NR approach in the scenario with the transmission power restriction according to various embodiments of the disclosure.

Figure 6:
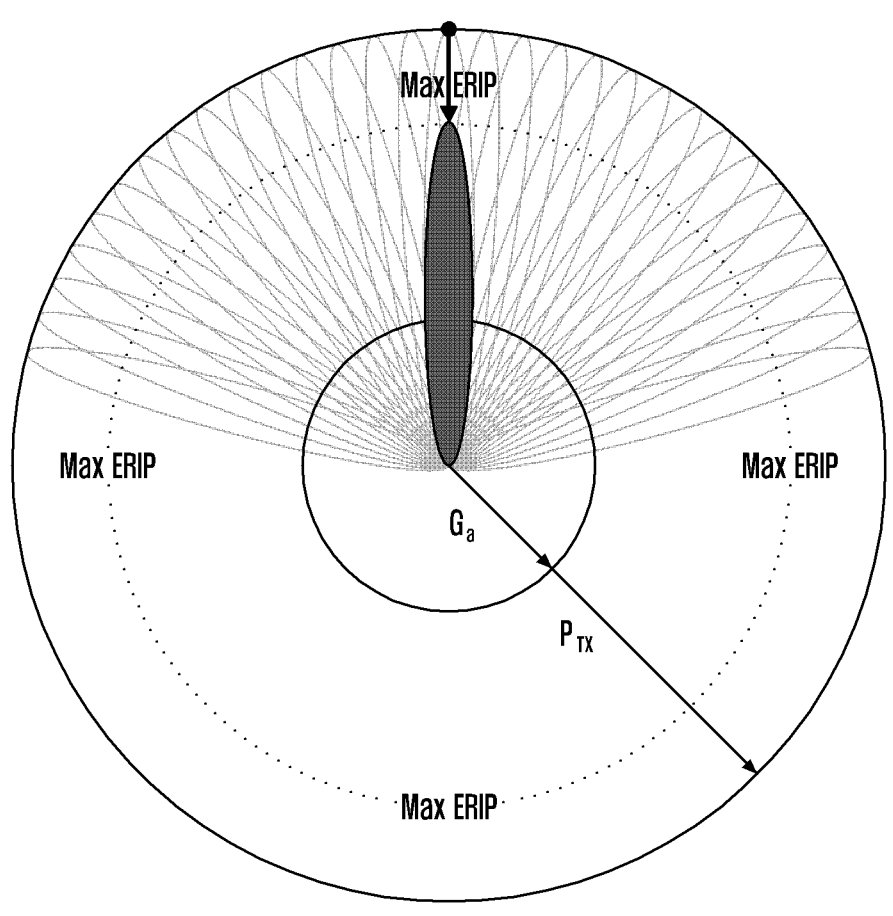
FIG. 6 is an illustration of reducing transmission power of the base station in view of the EIRP restrictions according to the related art.

Referring to FIG. 8A, which is similar to FIG. 6, contours illustrate possible beams in which transmission of data streams from the base station can be performed; the dashed circumference shows the restriction on transmission power from the base station (maxEIRP), and, by the example of one beam (colored grey), rendering of the value of power of transmission in the respective direction to said restriction is shown (the black arrow down). Since, as reported above, a narrow beam pattern and a high antenna gain is typical to next generation communication systems, reduction of transmission power owing to said rendering can be rather significant. As a result of such reduction in order to satisfy the EIRP restriction, there is substantially a headroom in the base station in the form of the unused transmission power.

Hereinafter, for the sake of simplicity, an example is analyzed when it is required to transmit two MIMO layers from the base station in the considered environment.

In accordance with the approach used in 5G NR, which has been described above in detail, one beamforming DFT vector with two orthogonal polarizations will be preferably used to transmit the two MIMO layers (see FIG. 8B). This is caused by the prioritized usage of the polarization dimension when generating a precoding matrix, as typical to said approach. The precoding matrix corresponding to the considered example with the two MIMO layers is shown in FIG. 4B. So, transmission of the two MIMO layers in this case will be performed in one spatial beam.

As outlined above, in accordance with the 5G NR approach, transmission power is uniformly distributed between all MIMO layers being transmitted, which is provided in this case by multiplier $1/\sqrt{L \cdot N_{CSI\text{-}RS}}$ which the considered precoding matrix is multiplied by. As a result of the division of the transmission power between the two MIMO layers, an additional reduction of the value of power per MIMO layer occurs in the considered case (the arrow down in FIG. 8B). Such an additional reduction of power may cause undesired decrease of bit rate of a respective data stream.

As seen, the absence of a capability to flexibly use transmission power in view of the existing EIRP restriction—in particular, the absence of a capability to employ the power headroom caused thereby in the base station—is typical to the 5G NR approach, besides the abovementioned impossibility of supporting antenna ports and MIMO layers in amounts required for next generation communication systems.

The disclosure is underlain by the approach of more flexibly generating a precoding matrix, while enabling to use, in the prioritized way, different beamforming DFT vectors in a required number, prior to involving the polarization space.

This approach is generally illustrated in FIG. 8C in the context of the example considered with reference to FIGS. 8A and 8B. In accordance with FIG. 8C, it is suggested using two different DFT vectors to generate the precoding matrix, to use, in the prioritized way, the DFT dimension rather than the polarization dimension. Therefore, each of the two MIMO layers will be transmitted in its separate beam, and, furthermore, the unused power (i.e. the headroom) in the base station, which is caused by the EIRP restriction, can be employed for this transmission. As seen from FIG. 8C, this approach enables to avoid the addition reduction of transmission power per MIMO layer, as in the case of the 5G NR approach (see FIG. 8B), and, respectively, the negative effects associated with said reduction.

A method 900 of beamforming for DL data transmission in a wireless communication system according to the disclosure is described hereinafter with reference to the flowchart of FIG. 9, where the wireless communication system can be, for example, a next generation wireless communication system.

Figure 9:
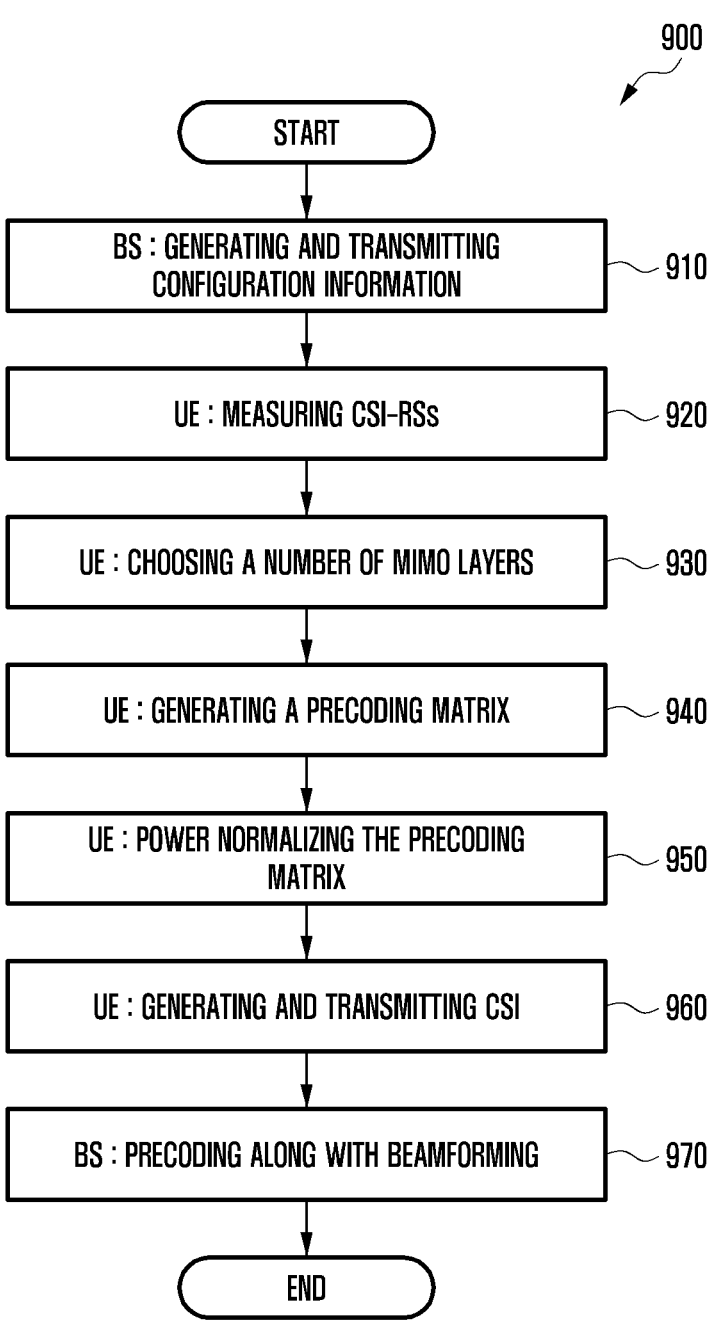
FIG. 9 is a flowchart of the method of beamforming for DL data transmission according to an embodiment of the disclosure.

FIG. 9 is a flowchart of the method of beamforming for DL data transmission according to an embodiment of the disclosure.

In operation 910, a base station (for instance, such as BS 702-A, 702-B, 702-C of FIG. 7) of the wireless communication system generates configuration information required for a user device (for example, such as UE 701-1, 701-2, . . . of FIG. 7) to signal CSI to the base station. This operation is in general similar to action 1 of FIG. 3 which illustrates the respective method according to 5G NR. Similarly to the case of 5G NR, the configuration information includes parameters of a code book. As described above, the code book defines an overall set of spatial beams in which data streams can be transmitted (in respective MIMO layers) from the base station, wherein each spatial beam is represented by a respective DFT vector in the code book.

As in the case of 5G NR, the parameters of the code book can comprise: a number ($N_1$) of antenna ports of the base station along a first spatial dimension (e.g. in horizontal direction) and a respective oversampling parameter ($O_1$), and a number ($N_2$) of antenna ports of the base station along a second spatial dimension (e.g. in vertical direction) and a respective oversampling parameter ($O_2$); accordingly, a number of DFT vectors defined by the code book is equal to $(N_1 \times O_1) \times (N_2 \times O_2)$. Once again, $N_1$ should be equal to or greater than $N_2$, thereby defining a particular spatial dimension as said first or second dimension.

According to one embodiment of the disclosure, a new parameter $N_{DFT}$, which is indicative of a maximum number of DFT vectors with one polarization in a precoding matrix to be generated, can be included into the configuration information. Application of this parameter when generating the precoding matrix according to the disclosure will be described below. The parameter $N_{DFT}$ is configured in the base station depending on implementation of the base station.

Examples of configuring said parameter are considered hereinafter. This consideration is conducted under assumption of using transmission of MIMO layers in one spatial beam as a reference, and under assumption that transmission power decreases by a factor of X to satisfy the EIRP restriction. It should be noticed herein that the decrease of power by a factor of X is implied in the linear domain (i.e. not in dB units). In the considered examples the $N_{DFT}$ can be set equal to X.

In this way, according to one example, if the base station uses ¼ of the maximum transmission power for transmission in one spatial beam, i.e. transmission power is reduced by a factor of 4 (with respect to the maximum transmission power) to satisfy the EIRP restriction, then $N_{DFT}$ can be set equal to 4. As discussed in detail above, in this case 4 DFT vectors—each with one polarization—can be used at the user device side to generate precoding vectors which form the precoding matrix for transmission of four MIMO layers. Since these 4 DFT vectors are orthogonal (the direction of maximum of the beam pattern of one DFT vector corresponds to zeroes of the beam pattern of the other DFT vectors) and the power headroom is available in the base station, then there is no necessity to proportionally reduce transmission power per MIMO layer in order to satisfy the EIRP restrictions, unlike the transmission in one beam. In the considered example it would be reasonable to use the 5G NR approach for more than four (e.g. 5) MIMO layers, i.e. with the priority of the polarization dimension (at first each DFT vector with two orthogonal polarizations), since there is no power headroom in the base station to use a DFT vector(s) without the power reduction.

In another example, if the base station uses ½ of the maximum transmission power for transmission in one spatial beam, then $N_{DFT}$ can be set equal to 2. In this case, 2 DFT vectors—each with one polarization—can be used to generate precoding vectors which form the precoding matrix for transmission of two MIMO layers (see FIG. 8C). Since these 2 DFT vectors are orthogonal and the power headroom is available in the base station, then there is again no necessity to proportionally reduce transmission power per MIMO layer in order to satisfy the EIRP restrictions, unlike the transmission in one beam.

According to another—alternative or additional—embodiment of the disclosure, information for power normalizing the precoding matrix in view of the acting EIRP restrictions can be included into the configuration information. Embodiments of how the information for normalizing can be set are described above.

The generated configuration information is transmitted from the base station to the user device. This transmission can be implemented by using DCI, MAC, RRC signaling or combination thereof.

In operation 920, the user device performs measurements of CSI-RSs received from the base station. This operation is in general similar to actions 2, 3 of FIG. 3. It should be clear to a skilled artisan that operation 910 does not have to mandatorily follow operation 920, and execution of operation 920 can take place in parallel with execution of operation 910 or even precede it.

As in the case of 5G NR, the base station sends a CSI feedback indication to the user device, and, upon reception of said feedback indication, the user device performs the following steps based on measurements of the CSI-RSs.

In operation 930, similarly to 5G NR, a preferable number L of MIMO layers is chosen in the user device, said number corresponding to a number of data streams simultaneously transmitted from the base station which the user device intends to receive.

In operation 940, the user device generates the precoding matrix. The precoding matrix is generated based on DFT vectors selected from the code book the parameters of which were signaled in operation 910. A number of precoding vectors which the precoding matrix is comprised of equals the number L of MIMO layers, as chosen in operation 930. The precoding vectors may represent columns of the precoding matrix, and this option will be used in a non-limiting way in subsequent illustrations of the disclosure.

According to an embodiment of the disclosure, the precoding matrix is generated as follows in operation 940.

i) If L is less than or equal to $N_{DFT}$, then L different DFT vectors are selected for generating L precoding vectors; each of the selected DFT vectors is used in the precoding matrix with one polarization. The different DFT vectors according to a preferred embodiment of the disclosure are orthogonal DFT vectors, and below, without limitation of generality, orthogonal DFT vectors will be referred to in this context.

ii) If $N_{DFT} < L \leq 2N_{DFT}$, then $N_{DFT}$ orthogonal DFT vectors are selected at first, to generate $N_{DFT}$ precoding vectors. Each of the selected $N_{DFT}$ DFT vectors is again used with one polarization in the precoding matrix. Then, the lacking $N_{next} = L - N_{DFT}$ precoding vectors are generated by using $N_{next}$ DFT vectors from the selected $N_{DFT}$ DFT vectors. Each DFT vector among the $N_{next}$ DFT vectors is used with a polarization which is different from the polarization with which said DFT vector has been already used in the precoding matrix. As in the case of the different DFT vectors, the different polarizations with which one DFT vector can be used in the precoding matrix are, according to the preferable embodiment of the disclosure, orthogonal polarizations which have been discussed above, and hereinbelow, without limitation of generality, orthogonal polarizations will be referred to in this context.

The prioritized usage of the DFT dimension over the polarization dimension is clearly seen for options i, ii.

iii) if $L>2N_{DFT}$, then $N_{DFT}$ is redefined as $N_{DFT}=$ceil(L/2), where ceil(a) refers to rounding the number a to the closest greater integer, and $N_{DFT}$ orthogonal DFT vectors are selected to generate L precoding vectors. At first 2·floor(L/2) precoding vectors are generated, where floor(b) refers to rounding the number b to the closest less integer, and to this end each of floor(L/2) DFT vectors among the selected $N_{DFT}$ DFT vectors is used with two orthogonal polarizations. If $N_{DFT}$ is odd, i.e. if mod(L,2)=1, then the remaining DFT vector among the $N_{DFT}$ DFT vectors is used with one polarization to generate the lacking precoding vector.

Option iii basically corresponds to the abovementioned 5G NR approach with prioritized usage of the polarization dimension. This option provides backward compatibility of the disclosure with the existing approaches.

Figure 4A:
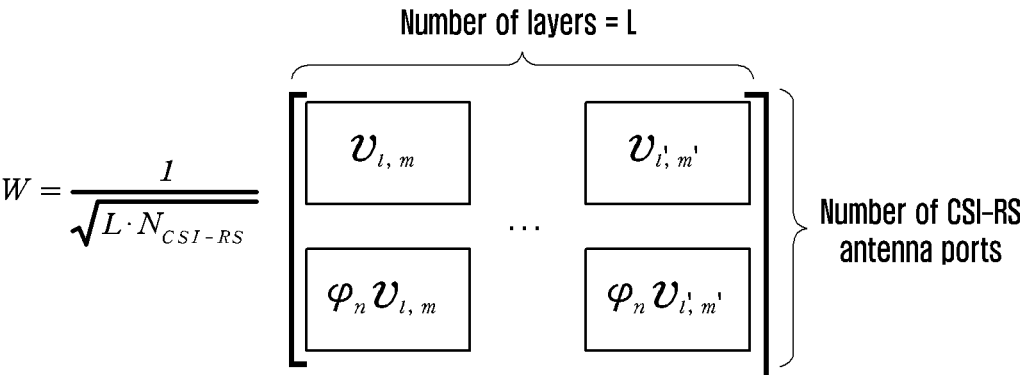
Figure 5:
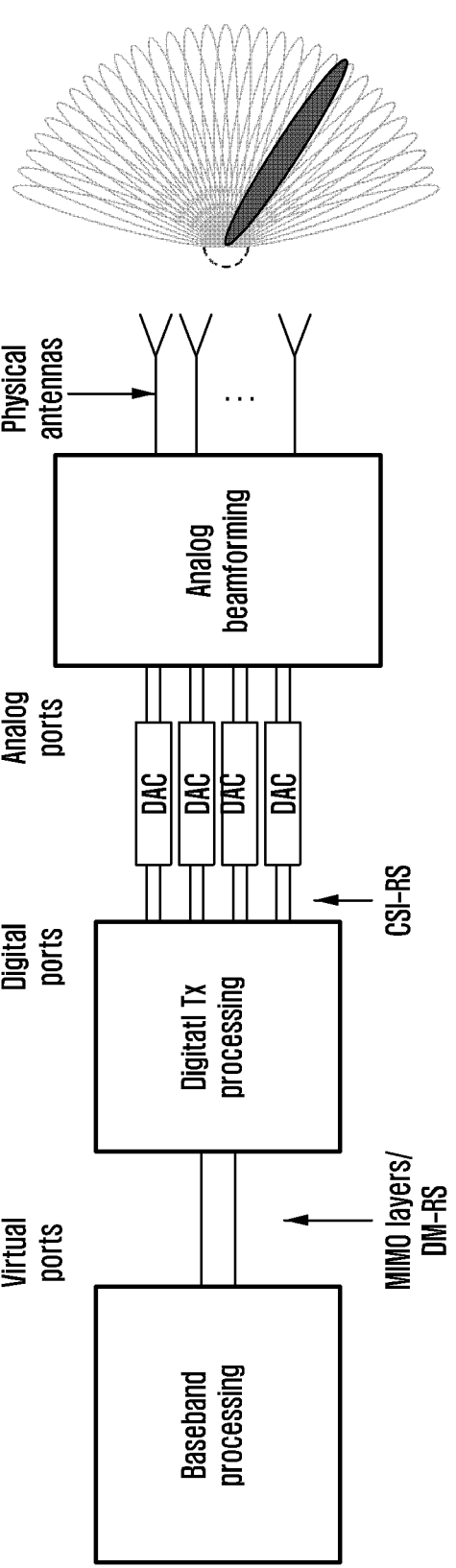
FIG. 5 is an illustrative scheme of applying precoding in a transmitter of the base station according to the related art.

Implementation of calculation of each precoding vector for options i-iii discussed above is similar to the one for 5G NR, as described with reference to FIG. 4A by using Equations 1-4.

In operation 950, normalization parameters for the generated precoding matrix are determined in the user device by using the power normalizing information from the configuration information received in operation 910. According to an embodiment of the disclosure, the normalization parameters comprise: a common normalization parameter to be applied to the precoding matrix as a whole, and one or more individual normalization parameters to be respectively applied to individual precoding vectors or groups of precoding vectors of the precoding matrix. Thereafter, in this step the normalization parameters applying to the precoding matrix. Embodiments of the determining and the applying the normalization parameters according to the disclosure will be described below.

Figure 1:
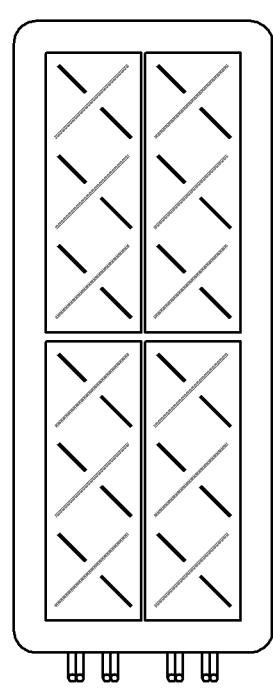
FIG. 1 is an illustrative example of a 2D antenna subarray of a base station according to the related art.
Figure 2:
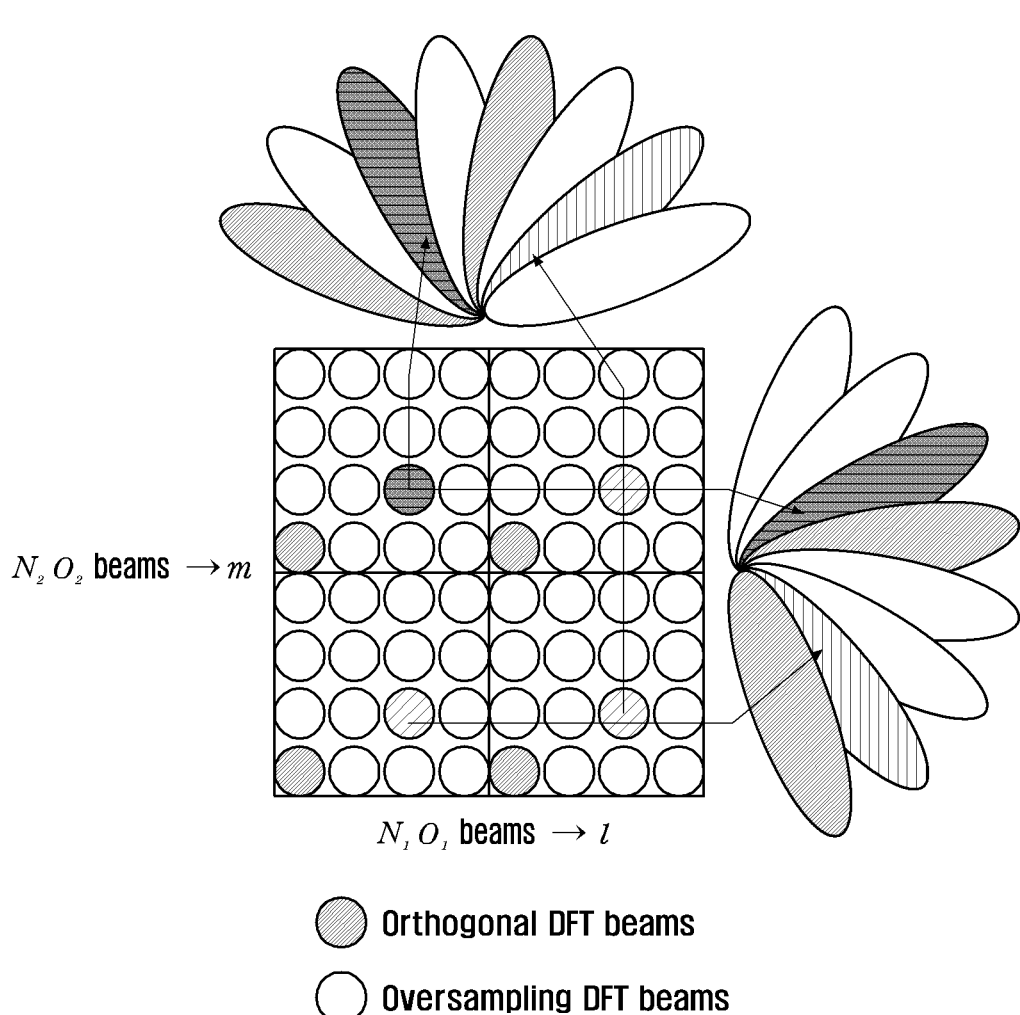
FIG. 2 is an illustrative representation of a code book according to the related art.
Figure 3:
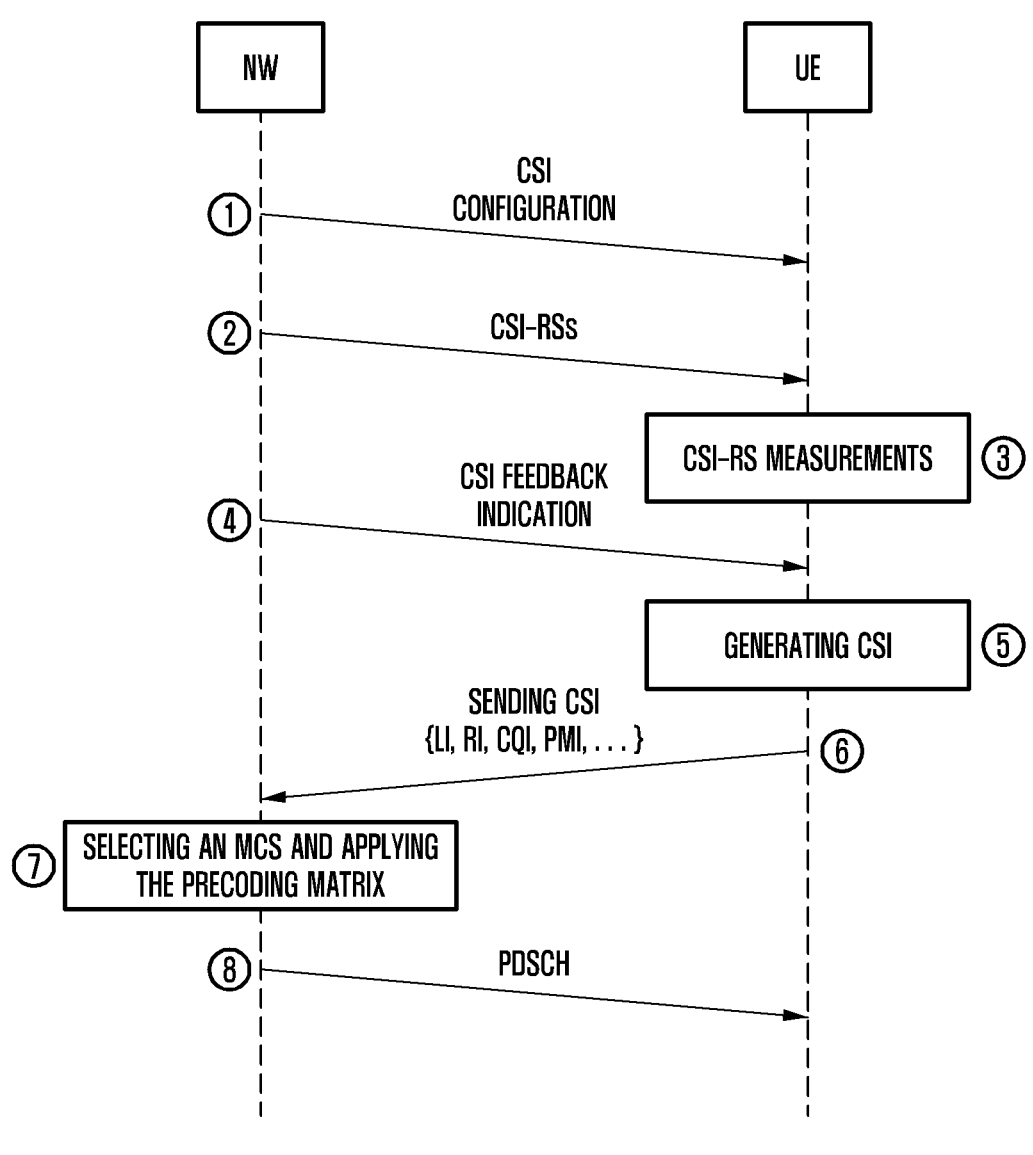
FIG. 3 is a generalized scheme of interaction between a wireless communication network and a user device to enable to perform precoding in the base station according to the related art.

The operations according to operations 930-950, as discussed above, in general correspond to actions 4, 5 of FIG. 3.

In operation 960, like in the case of 5G NR, the user device generates the CSI including inter alia: an indication (RI) of the chosen number L of MIMO layers, and an indication (PMI) of the precoding matrix, and performs uplink transmission of the generated CSI to the base station. This operation is in general similar to action 6 of FIG. 3.

In operation 970, similarly to the case of 5G NR, the base station performs precoding along with beamforming based on the RI and the PMI from the received CSI. This operation is in general similar to action 7 of FIG. 3.

FIGS. 10A, 10B, 10C, 10D, 11A, and 11B are illustrative examples of precoding matrices generated according to various embodiments of the disclosure.

FIGS. 10A to 10C provide, in the format similar to FIG. 4B, examples of precoding matrices built according to various embodiments of the disclosure.

FIG. 10A illustrates precoding matrices for $N_{DFT}$=4, FIG. 10B illustrates precoding matrices for $N_{DFT}$=6, FIG. 10C illustrates precoding matrices for $N_{DFT}$=8, FIG. 10D illustrates precoding matrices for $N_{DFT}$=1, and in each of those figures precoding matrices are presented for a chosen number of MIMO layers sequentially from L equal to 1 (from the upper left corner) to L equal to 8 (to the upper right corner).

Referring to FIGS. 10A to 10C, when building a precoding matrix, the DFT dimension is used to the maximum extent, and only thereafter the polarization dimension is involved. The generated precoding matrices, as illustrated in FIGS. 10A to 10C, substantially correspond to options i, ii of operation 940 described above.

The generated precoding matrices according to FIG. 10D correspond to the 5G NR approach discussed above, wherein the polarization dimension is used at first to the maximum extent, and only thereafter the DFT dimension is involved. The precoding matrices illustrated in FIG. 10D correspond to the backward compatibility option iii according to operation 940.

The approach according to the disclosure substantially provides extension of the Type 1 code book which has been discussed above, said extension being illustrated in the table below, where new supported configurations of the code book are presented under the row with ellipses (said row itself and a row(s) above it are implied to precisely form Table 5.2.2.2.1-2):

TABLE 5.2.2.2.1-2

| Number of antenna ports CSI-RS | $(N_1, N_2)$ | $(O_1, O_2)$ |
|---|---|---|
| 4 | (2, 1) | (4, 1) |
| . . . | . . . | . . . |
| 48 | (4, 6) | (4, 4) |
| | (8, 3) | (4, 4) |
| | (12, 2) | (4, 4) |
| | (24, 1) | (4, 1) |
| 64 | (8, 4) | (4, 4) |
| | (16, 2) | (4, 4) |
| | (32, 1) | (4, 1) |
| 96 | (8, 6) | (4, 4) |
| | (12, 4) | (4, 4) |
| | (16, 3) | (4, 4) |
| | (24, 2) | (4, 4) |
| | (48, 1) | (4, 1) |
| 128 | (8, 8) | (4, 4) |
| | (16, 4) | (4, 4) |
| | (32, 2) | (4, 4) |
| | (64, 1) | (4, 1) |
| 192 | (8, 12) | (4, 4) |
| | (16, 6) | (4, 4) |
| | (24, 4) | (4, 4) |
| | (38, 3) | (4, 4) |
| | (48, 2) | (4, 4) |
| | (96, 1) | (4, 1) |
| 256 | (16, 8) | (4, 4) |
| | (32, 4) | (4, 4) |
| | (64, 2) | (4, 4) |
| | (128, 1) | (4, 1) |

Owing to said extension, support of up to 256 CSI-RS antenna ports and 16 MIMO layers per UE is provided, which, in particular, satisfies the requirements of the 6G xMIMO communication system.

In accordance with a preferred embodiment of the disclosure, for the sake of reducing, for the user device, the space of search among DFT vectors and thereby reducing computational complexity at the user device side, it is proposed to support numbers $N_{CSI-RS}$ of CSI-RS antenna ports from the following set: {2, 4, 8, 12, 16, 24, 32, 48, 64, 96, 128, 192, 256}, and to support numbers L of MIMO layers, as chosen by the user device (see operation 930), from the following set {1, 2, 3, 4, 5, 6, 7, 8, 10, 12, 14, 16}.

Figure 11B:
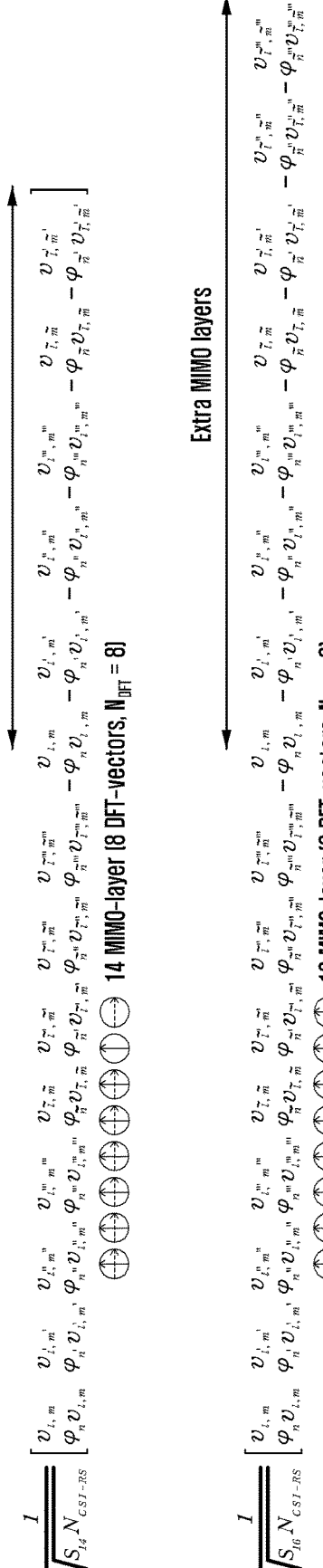

FIGS. 11A and 11B respectively provide examples of precoding matrices built according to the approach of the disclosure for L=10, 12, 14, 16 MIMO layers, i.e. specifically for the numbers of MIMO layers which cannot be taken into account by the 5G NR approach. The horizontal bi-directional arrow in those figures encompasses, in each of the shown precoding matrices, precoding vectors corresponding to the MIMO layers the support of which is provided due to the abovementioned extension according to the disclosure, in other words—the extra MIMO layers.

It should be emphasized that the orthogonal polarizations are shown in each of FIGS. 10A to 10D, 11A, and 11B as vertical and horizontal ones solely as a non-limiting example; moreover, the order of precoding vectors in each of the shown precoding matrices can be different.

It accordance with the detailed disclosure given above, the EIRP restriction in the base station is not taken into account by the 5G NR approach, and some i-th precoding matrix generated in accordance with said approach for L MIMO layers can be generally expressed as $$W_i^{(L)} = \frac{1}{\sqrt{L \cdot N_{CSI-RS}}} \left[ w_i^{(1)} \quad w_i^{(2)} \quad \ldots \quad w_i^{(L)} \right], \quad \text{Equation 6}$$

i.e. with multiplying the entire precoding matrix by the normalization multiplier $1/\sqrt{L \cdot C_{SI-RS}}$ to uniformly distribute transmission power of the base station onto all the L MIMO layers. In Equation 6, $$w_i^{(k)},$$

where k=1, 2, . . . , L, is the k-th precoding vector in the precoding matrix $$W_i^{(L)}.$$

As noted when describing operation 950 of the method 900, according to the embodiment of the disclosure the power normalization parameters for the generated precoding matrix comprise both the common normalization parameter to be applied to the precoding matrix as a whole, and the one or more individual normalization parameters which can be respectively applied to individual precoding vectors of the precoding matrix or groups thereof. In particular, the i-th precoding matrix generated in accordance with the embodiment of the disclosure for L MIMO layers can be similarly expressed as $$W_i^{(L)} = \frac{1}{\sqrt{S_i(L) \cdot N_{CSI-RS}}} \left[ s_{i,L}^{(1)} w_i^{(1)} \quad s_{i,L}^{(2)} w_i^{(2)} \quad \ldots \quad s_{i,L}^{(L)} w_i^{(L)} \right]. \quad \text{Equation 7}$$

In Equation 7, the normalization multiplier $1/\sqrt{S_i(L) \cdot N_{CSI-RS}}$ includes the common normalization parameter $S_i(L)$ to be applied to the entire precoding matrix $$W_i^{(L)},$$

furthermore, the individual normalization parameters $$s_{i,L}^{(k)}$$

are respectively applied to the precoding vectors $$w_i^{(k)}, k = 1, 2, \ldots, L.$$

Referring to FIGS. 10A to 10D, 11A and 11B, the respective common normalization parameter is shown within the normalization multiplier by which each of the precoding matrices is multiplied. The default value of the common normalization parameter $S_i(L)$ is L, i.e. by default $S_i(L)$ L. This value of the common normalization parameter has been used for the precoding matrices in FIG. 10D. Then, in each of FIGS. 10A to 10D, 11A and 11B all the individual normalization parameters are set equal to 1 for all the precoding matrices, which is the default value of any individual normalization parameter, i.e. by default $$s_{i,L}^{(k)} = 1.$$

According to the preferred embodiment of the disclosure, for each value of L from the reduced set of values {1, 2, 3, 4, 5, 6, 7, 8, 10, 12, 14, 16}, a respective common normalization parameter S(L) is calculated in the base station based on the predefined EIRP restriction (maxEIRP) by using Equation 5 and taking said value of L into account. The calculated set of the common normalization parameters is included into the power normalizing information which is in turn included into the configuration information (see operation 910 of the method 900) transmitted from the base station to the user device.

The user device, in operation 950 of the method 900, selects, from the set of common normalization parameters received from the base station, a common normalization parameter which corresponds to the number L of MIMO layers, as chosen in operation 930, and applies the selected common normalization parameter, within the normalization multiplier, to the precoding matrix generated in operation 940.

Individual normalization parameters in accordance with the considered embodiment of the disclosure can be determined in a flexible way.

First, individual normalization parameters can be determined with different granularities. In particular, individual normalization parameters can be determined individually for each MIMO layer, i.e.

$$s_{i,L}^{(k)}$$

in Equation 7 will be individual for respective precoding vectors $$w_i^{(k)}$$

in the precoding matrix. Normalization parameters can be also determined individually for a group or groups of MIMO layers, and in this case $$s_{i,L}^{(k)}$$

in Equation 7 will be identical for precoding vectors $$w_i^{(k)}$$

which correspond to the group(s) of MIMO layers. Of course, these two options can be applied with respect to one precoding matrix separately and/or in combination. Finally, individual normalization parameters can be identical for all precoding vectors in the precoding matrix, as in the above examples where the default value equal to 1 is used.

Second, individual normalization parameters can be determined, at least partially, directly in the user device and/or they can be determined, at least partially, in the base station and signaled to the user device, for example, in the power normalizing information within the configuration information.

An example of determining individual normalization parameters in the user device according to an embodiment of the disclosure is provided below with reference to FIG. 12.

Figure 12:
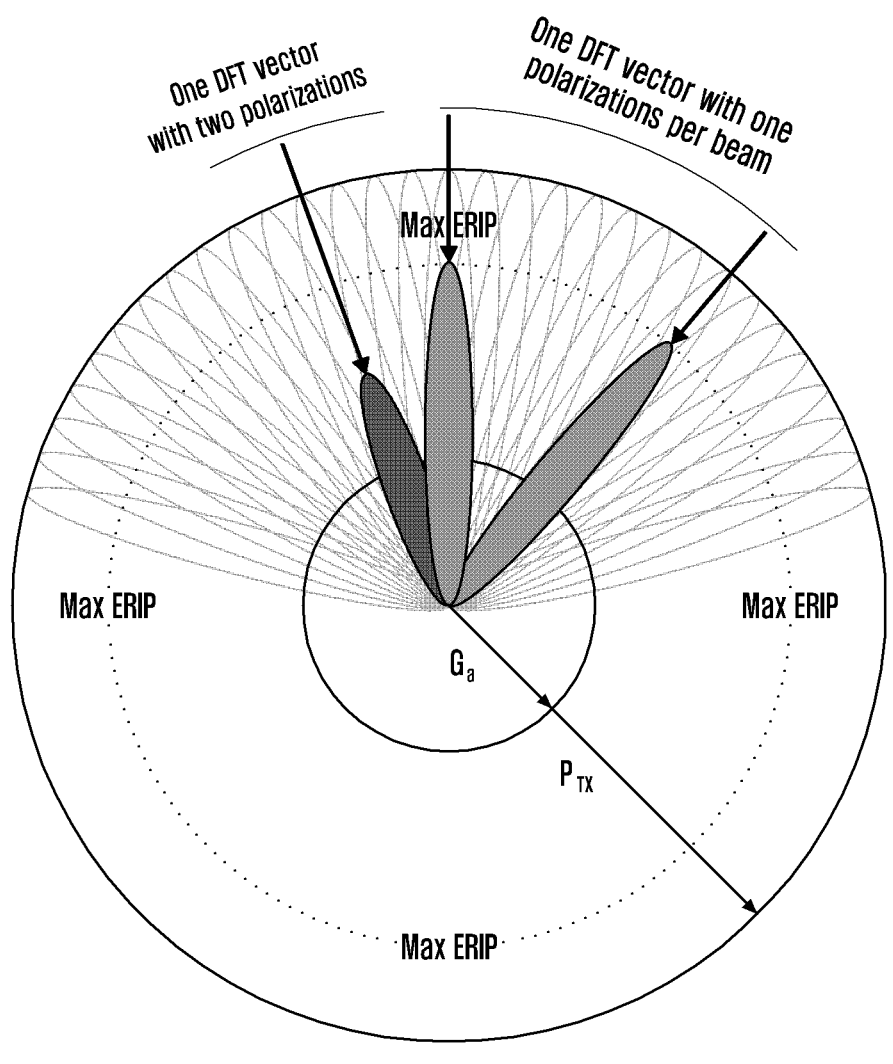
FIG. 12 is an illustrative example of determining individual normalization parameters according to an embodiment of the disclosure.

Referring to FIG. 12, similarly to FIGS. 6, and 8A to 8C, contours illustrate possible beams in which transmission of MIMO layers from the base station can be performed, the dashed circumference shows the restriction on transmission power from the base station (maxEIRP). With reference to this figure, the example is considered where, in said environment, the base station is recommended to transmit four MIMO layers in three spatial beams. The precoding matrix is accordingly generated in the user device by using three DFT vectors where two DFT vectors are each used with one polarization (in FIG. 12 the respective beams are colored grey) and one DFT vector with two orthogonal polarizations (in FIG. 12 the respective beam is colored black).

As seen from FIG. 12 and in accordance with the aforesaid, such usage of the one spatial beam (black) to transmit the two MIMO layers causes the additional (by a factor of two in total) reduction of transmission power per MIMO layer in the base station. At the same time, the disclosure enables to avoid said additional reduction of transmission power for the beams (grey) with correspond to the DFT vectors with one polarization. As described in detail above, in the scenarios where there is the EIRP restriction, such usage of individual beams to transmit individual MIMO layers does not lead to the indicated additional power reduction due to employing the power headroom in the base station for said transmission.

In the considered non-limiting example, the individual normalization parameter is set equal to 1 for each of the precoding vectors corresponding to the black beam, whereas the individual normalization parameter is set equal to $\sqrt{2}$ for each of the precoding vectors corresponding to the grey beams.

It should be emphasized once again that such a flexible approach to using transmission power of the base station in the considered context cannot be implemented in 5G NR, where every new MIMO layer added causes proportional reduction of power for the other MIMO layers, irrespective of acting restrictions.

In order to generalize the example discussed above with reference to FIG. 12, according to this embodiment of the disclosure, when determining individual normalization parameters in the user device (see operation 950), an individual normalization parameter is determined for each precoding vector of the generated precoding matrix depending on whether or not the same DFT vector is used with orthogonal signal polarizations both for a MIMO layer associated with said precoding vector and for a MIMO layer associated with another precoding vector.

As follows from the aforesaid, the disclosure provides implementation of precoding with extension to support of systems with ultra-large antenna arrays, as well as flexible optimization of usage of transmission power in the base station in beamforming for DL transmission, which is general provides improved performance in scenarios with restrictions on transmission power.

Computer simulation has been carried out in the context of the 6G xMIMO system, using standard techniques and respective sets of parameters, with respect to the aspects of the disclosure disclosed above—both separately and in combination. Results of the simulation are indicative of improved system performance, in particular—improved throughput at the user device side.

While the disclosure has been shown and described with reference to various embodiments thereof, it will be understood by those skilled in that art that various changes in form and details may be made therein without departing from the spirit and scope of the disclosure as defined by the appended claims and their equivalents.

What is claimed is:

1. A method performed by a user equipment (UE) supporting a beam forming in a wireless communication system, the method comprising:

receiving, from a base station, configuration information on channel state information (CSI) including parameters of a code book and a parameter ($N_{DFT}$) indicative of a maximum number of discrete Fourier transform (DFT) vectors with one signal polarization in a precoding matrix;

receiving, from the base station, CSI reference signals (CSI-RSs);

choosing a number (L) of MIMO layers;

based on the parameters of the code book, the parameter indicative of the maximum number of DFT vectors and the number (L) of MIMO layers, generating the precoding matrix including precoding vectors, wherein a number of the precoding vectors is same as the number (L) of the MIMO layers; and based on the received CSI-RSs, transmitting, to the base station, CSI including at least one of a rank indicator (RI) of a chosen number L of multiple input and multiple output (MIMO) layers, and a precoding matrix indicator (PMI).

2. The method of claim 1, wherein generating the precoding matrix comprising:

in case that $L \leq N_{DFT}$, generating L precoding vectors by using L different DFT vectors, each being used with one signal polarization;

in case that $N_{DFT} < L \leq 2N_{DFT}$, generating $N_{DFT}$ precoding vectors by using $N_{DFT}$ different DFT vectors, each being used with one signal polarization, and generating further $N_{next}$ precoding vectors, where $N_{next} = L - N_{DFT}$, by using $N_{next}$ DFT vectors from the $N_{DFT}$ DFT vectors, each of the $N_{next}$ DFT vectors being used with a signal polarization different from said one signal polarization with which said DFT vector has been already used in the precoding matrix; or in case that $L > 2N_{DFT}$, generating L precoding vectors by using $N_{DFT}$=ceil (L/2) different DFT vectors, wherein each of floor (L/2) DFT vectors among the $N_{DFT}$ DFT vectors is used with two different signal polarizations to generate 2·floor (L/2) precoding vectors, and, if mod (L,2)=1, a remaining DFT vector among the $N_{DFT}$ DFT vectors is used with one signal polarization to generate a respective precoding vector.

3. The method of claim 1, wherein the parameters of the code book include at least one of a number ($N_1$) of antenna ports of the base station along a first spatial dimension and a respective oversampling parameter ($O_1$), and a number ($N_2$) of antenna ports of the base station along a second spatial dimension and a respective oversampling parameter ($O_2$), wherein a number of DFT vectors defined by the code book is equal to ($N_1 \times O_1$)$\times$($N_2 \times O_2$).

4. The method of claim 1,
wherein different DFT vectors are orthogonal DFT vectors,
wherein different signal polarizations are orthogonal signal polarizations, and
wherein the configuration information is transmitted by using at least one of downlink control information (DCI), medium access control (MAC), radio resource control (RRC) signaling.

5. The method of claim 1, further comprising:
determining L individual normalization parameters, wherein the individual normalization parameters are respectively individual for the L MIMO layers.

6. The method of claim 5,
wherein the determining of the individual normalization parameters comprises:
determining an individual normalization parameter for each precoding vector of the precoding matrix depending on whether a same DFT vector is used with different signal polarizations both for a MIMO layer associated with precoding vector and for a MIMO layer associated with another precoding vector of the precoding matrix, and
setting an individual normalization parameter for each precoding vector of the precoding matrix to 1, and
wherein applying the normalization parameters further comprises:
multiplying the precoding vectors of the precoding matrix by the respective determined individual normalization parameters.

7. A method performed by a base station supporting a beam forming in a wireless communication system, the method comprising:
generating configuration information on channel state information (CSI) including parameters of a code book and a parameter ($N_{DFT}$) indicative of a maximum number of discrete Fourier transform (DFT) vectors with one signal polarization in a precoding matrix and information for a power normalizing the precoding matrix;
transmitting, to a user equipment (UE), the configuration information on the CSI;
transmitting, to the UE, CSI reference signals (CSI-RSs);
receiving, from the UE, CSI including at least one of a rank indicator (RI) of a chosen number L of multiple input and multiple output (MIMO) layers, and a precoding matrix indicator (PMI);
determining normalization parameters for the generated precoding matrix based on normalizing information, wherein the determined normalization parameters include a common normalization parameter applied to the precoding matrix as a whole and an individual normalization parameter respectively applied to individual precoding vectors or groups of precoding vectors of the precoding matrix; and
applying the determined normalization parameters to the generated precoding matrix.

8. The method of claim 7,
wherein L is chosen from a plurality of preset values and a maximum value of the L is 16.

9. The method of claim 8, further comprising:
calculating a respective common normalization parameter based on at least one of a predefined EIRP restriction, an antenna gain, a transmission power, and value of L for each value of L among a plurality of preset values; and
including the calculated common normalization parameters into the normalizing information.

10. The method of claim 9,
wherein determining the normalization parameters comprises:
selecting, among the calculated common normalization parameters, a common normalization parameter corresponding to said chosen number L of MIMO layers, for being applied to the generated precoding matrix, and
wherein the applying the common normalization parameter comprises:
multiplying the precoding matrix by a normalization multiplier which includes said common normalization parameter.

11. A user equipment (UE) supporting a beam forming in a wireless communication system, the UE comprising:
a transceiver; and
a controller coupled with the transceiver, and configured to:
receive, from a base station, configuration information on channel state information (CSI) including parameters of a code book and a parameter ($N_{DFT}$) indicative of a maximum number of discrete Fourier transform (DFT) vectors with one signal polarization in a precoding matrix,
receive, from the base station, CSI reference signals (CSI-RSs),
choose a number (L) of MIMO layers,
based on the parameters of the code book, the parameter indicative of the maximum number of DFT vectors and the number (L) of MIMO layers, generate the precoding matrix including precoding vectors, wherein a number of the precoding vectors is same as the number (L) of the MIMO layers, and
based on the received CSI-RSs, transmit, to the base station, CSI including at least one of a rank indicator (RI) of a chosen number L of multiple input and multiple output (MIMO) layers, and a precoding matrix indicator (PMI).

12. The UE of claim 11, wherein the controller is further configured to:
in case that $L \leq N_{DFT}$, generate L precoding vectors by using L different DFT vectors, each being used with one signal polarization;
in case that $N_{DFT} < L \leq 2N_{DFT}$, generate $N_{DFT}$ precoding vectors by using $N_{DFT}$ different DFT vectors, each being used with one signal polarization, and generating further $N_{next}$ precoding vectors, where $N_{next} = L - N_{DFT}$, by using $N_{next}$ DFT vectors from the $N_{DFT}$ DFT vectors, each of the $N_{next}$ DFT vectors being used with a signal polarization different from said one signal polarization with which said DFT vector has been already used in the precoding matrix; or
in case that $L > 2N_{DFT}$, generate L precoding vectors by using $N_{DFT} = $ceil (L/2) different DFT vectors, wherein each of floor (L/2) DFT vectors among the $N_{DFT}$ DFT vectors is used with two different signal polarizations to generate 2·floor (L/2) precoding vectors, and, if mod (L,2)=1, a remaining DFT vector among the $N_{DFT}$ DFT vectors is used with one signal polarization to generate a respective precoding vector.

13. The UE of claim 11, wherein the parameters of the code book include at least one of a number ($N_1$) of antenna ports of the base station along a first spatial dimension and a respective oversampling parameter $(O_1)$, and a number $(N_2)$ of antenna ports of the base station along a second spatial dimension and a respective oversampling parameter $(O_2)$, wherein a number of DFT vectors defined by the code book is equal to $(N_1 \times O_1) \times (N_2 \times O_2)$.

14. The UE of claim 11,
wherein different DFT vectors are orthogonal DFT vectors,
wherein different signal polarizations are orthogonal signal polarizations, and
wherein the configuration information is transmitted by using at least one of downlink control information (DCI), medium access control (MAC), radio resource control (RRC) signaling.

15. The UE of claim 11, wherein the controller is further configured to:
determine L individual normalization parameters, wherein the individual normalization parameters are respectively individual for the L MIMO layers.

16. The UE of claim 11, wherein the controller is further configured to:
determine an individual normalization parameter for each precoding vector of the precoding matrix depending on whether a same DFT vector is used with different signal polarizations both for a MIMO layer associated with precoding vector and for a MIMO layer associated with another precoding vector of the precoding matrix, set an individual normalization parameter for each precoding vector of the precoding matrix to 1, and
multiply precoding vectors of the precoding matrix by the respective determined individual normalization parameters.

17. A base station supporting a beam forming in a wireless communication system, the base station comprising:
a transceiver; and
a controller configured to:
generate configuration information on channel state information (CSI) including parameters of a code book and a parameter $(N_{DFT})$ indicative of a maximum number of discrete Fourier transform (DFT)

vectors with one signal polarization in a precoding matrix and information for a power normalizing the precoding matrix,
transmit, to a user equipment (UE), the configuration information on the CSI,
transmit, to the UE, CSI reference signals (CSI-RSs),
receive, from the UE, CSI including at least one of a rank indicator (RI) of a chosen number L of multiple input and multiple output (MIMO) layers, and a precoding matrix indicator (PMI),
determine normalization parameters for the generated precoding matrix based on normalizing information, wherein the determined normalization parameters include a common normalization parameter applied to the precoding matrix as a whole and an individual normalization parameter respectively applied to individual precoding vectors or groups of precoding vectors of the precoding matrix, and
apply the determined normalization parameters to the generated precoding matrix.

18. The base station of claim 17,
wherein L is chosen from a plurality of preset values and a maximum value of the L is 16.

19. The base station of claim 18, wherein the controller is further configured to:
calculate a respective common normalization parameter based on at least one of a predefined EIRP restriction, an antenna gain, a transmission power, and value of L for each value of L among a plurality of preset values, and
include the calculated common normalization parameters into the normalizing information.

20. The base station of claim 19, wherein the controller is further configured to:
select, among the calculated common normalization parameters, a common normalization parameter corresponding to said chosen number L of MIMO layers, for being applied to the generated precoding matrix, and
multiply the precoding matrix by a normalization multiplier which includes said common normalization parameter.

* * * * *